United States Patent
Hosoya et al.

(10) Patent No.: US 7,639,431 B2
(45) Date of Patent: Dec. 29, 2009

(54) ZOOM LENS

(75) Inventors: Takeshi Hosoya, Shibuya-ku (JP); Atsujiro Ishii, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 143 days.

(21) Appl. No.: 11/899,873

(22) Filed: Sep. 7, 2007

(65) Prior Publication Data

US 2009/0002845 A1    Jan. 1, 2009

(30) Foreign Application Priority Data

Sep. 12, 2006    (JP)    ............................. 2006-246349

(51) Int. Cl.
*G02B 15/16* (2006.01)
(52) U.S. Cl. ...................... 359/690; 359/689
(58) Field of Classification Search ................ 359/683, 359/686, 687, 689, 690; 348/240.99–240.3, 348/335–369; 396/72–88
See application file for complete search history.

(56) References Cited

U.S. PATENT DOCUMENTS

| | | | | |
|---|---|---|---|---|
| 6,650,475 | B1 * | 11/2003 | Hamano | 359/557 |
| 7,199,940 | B2 * | 4/2007 | Obama et al. | 359/683 |
| 7,251,081 | B2 * | 7/2007 | Sato | 359/676 |
| 2004/0136086 | A1 * | 7/2004 | Ohtake | 359/687 |

FOREIGN PATENT DOCUMENTS

JP    04-321007    11/1992

* cited by examiner

*Primary Examiner*—Darryl J Collins
(74) *Attorney, Agent, or Firm*—Kenyon & Kenyon LLP

(57) ABSTRACT

The invention relates to a zoom lens which, albeit being of simplified construction, makes sure brightness and holds back fluctuations of astigmatism, and facilitates making sure being fast and the angle of view and the zoom ratio at the wide-angle end. The zoom lens comprises a first group G1 of positive power, a second group G2 of negative power and a third group G3 of positive power, with a stop S between the second group G2 and the third group G3. Upon zooming from the wide-angle end to the telephoto end, the first group G1, the second group G2, and the third group G3 moves; the second group G2 moves toward the object side after moving toward the image side; the first group G1 and the third group G3 are positioned on the object side at the telephoto end with respect to the wide-angle end. The first group G1 comprises one negative lens and one or two positive lenses, and the second group G2 comprises a first negative meniscus lens convex on its object side, a second negative lens wherein the image side surface is larger in the absolute value of a curvature than the object side surface, and a third positive lens wherein the object side surface is larger in the absolute value of a curvature than the image side surface. Upon focusing from a far distance to a near distance, the second group G2 moves.

10 Claims, 16 Drawing Sheets

ZOOM LENS

This application claims benefit of Japanese Application No. 2006-246349 filed in Japan on Sep. 12, 2006, the contents of which are incorporated by this reference.

BACKGROUND OF THE INVENTION

The present invention relates generally to a zoom lens, and specifically to a zoom lens that has a half angle of view of about 35° to about 45° at the wide-angle end and is adapted to cover a standard angle-of-view area having a zoom ratio of about 2.5 to about 4.

More specifically, the present invention concerns a zoom lens suitable for use as an interchangeable lens for single-lens reflex cameras.

Downsizing-oriented, simple zoom lens arrangements have been proposed so far in the art. For instance, Patent Publication 1 discloses a zoom lens comprising, in order from its object side, a first lens group of positive refracting power, a second lens group of negative refracting power and a third lens group of positive refracting power, with each group moving for zooming. It is said therein that the zoom lens is easy to carry and cuts back on fabrication cost due to a simplified lens mount arrangement and a short length at the wide-angle end.

A problem with the zoom lens set forth in Patent Publication 1 is, however, that for the reason that the second lens group is made up of two lenses, it is difficult to maintain optical properties, and there is not bound to be enough of brightness. With the zoom lens exemplified in Example 2 of Patent Publication 1, astigmatism is likely to occur at or near an intermediate focal length, although the second lens group is made up of three lenses. Nowhere in Patent publication is there anything about focusing operation.

Patent Publication 1

JP(A)4-321007

SUMMARY OF THE INVENTION

In view of such situations with the prior art as mentioned above, the present invention has for its object the provision of a zoom lens that, albeit being simple in construction, makes sure being fast and holds back astigmatism fluctuations. It is thus possible to provide a zoom lens that, albeit being a fast one, makes it easy to have the desired angle of view and zoom ratio as the wide-angle end.

According to the present invention, the aforesaid object is achieved by the provision of a zoom lens comprising, in order from its object side to its image side, a first lens group of positive refracting power, a second lens group of negative refracting power and a third lens group of positive refracting power, with an aperture stop located in a space between said second lens group and said third lens group, wherein:

upon zooming from the wide-angle end to the telephoto end of the zoom lens, said first lens group, said second lens group, and said third lens group moves in unison, said second lens group moves toward the image side and then toward the object side, and at the telephoto end with respect to the wide-angle end, said first lens group is positioned on the object side and said third lens group is positioned on the object side;

said first lens group comprises, in order from the object side, one negative lens and one or two positive lenses, said second lens group comprises, in order from the object side, a first negative meniscus lens convex on the object side, a second negative lens wherein the image side surface is larger in the absolute value of a paraxial curvature than the object side surface, and a third positive lens wherein the object side surface is lager in the absolute value of a paraxial curvature than the image side surface, and upon focusing from a far object to a near object, the second lens group moves, with satisfaction of the following conditions:

$$-0.1 < m_2/f_t < 0.4 \quad (1)$$

$$-1.3 < (r_{2g3} + r_{2g4})/(r_{2g4} - r_{2g3}) < -0.65 \quad (2)$$

where $f_t$ is the focal length of the whole zoom lens system at the telephoto end, $m_2$ is the amount of movement of the second lens group at the telephoto end with respect to the wide-angle end with a plus sign indicative of a displacement of the second lens group toward the object side, $r_{2g3}$ is the paraxial radius of curvature of the object side surface of the second negative lens in the second lens group, and $r_{2g4}$ is the paraxial radius of curvature of the image side surface of the second negative lens in the second lens group.

Specific arrangements of, and specific requirements for, the invention are now explained.

In the zoom lens of the invention, there is an aperture stop located in a space between the second lens group and the third lens group, and the lens group each move in unison upon zooming from the wide-angle end to the telephoto end.

With such a specific arrangement, it is possible to obtain a zoom lens of simplified construction. The location of the aperture stop at that position works for avoiding an increase in the diameter of the first lens group, setting an exit pupil at an appropriately far position, etc.

And upon zooming from the wide-angle end to the telephoto end, the zoom lens operates in such a mode that the second lens group moves once toward the image side and then toward the object side; and at the telephoto end with respect to the wide-angle end, the first lens group is positioned on the object side and the third lens group is positioned on the object side.

With such a specific arrangement, the full length of the zoom lens is made short at or near the wide-angle end, and the zoom lens is downsized for carrying. In this case, if the aforesaid zooming mode is applied to the second lens group, it is then possible to keep low the height of rays through the second lens group in or near the intermediate state and thereby to help hold back astigmatism fluctuations.

And then, the zoom lens of the invention is set up in such a way as to satisfy the following condition (1).

$$-0.1 < m_2/f_t < 0.4 \quad (1)$$

Here, $f_t$ is the focal length of the whole zoom lens system at the telephoto end, and $m_2$ is the amount of movement of the second lens group at the telephoto end with respect to the wide-angle end with a plus sign indicative of a displacement of the second lens group toward the object side, It is preferable that the second lens group at the telephoto end is positioned at much the same location as the wide-angle end defined by condition (1) or at a location a little nearer to the object side, because the third lens group can be moved a lot more while holding back a change in the whole length of the zoom lens.

And, the second lens group is likely to become smaller than other lens groups; if it is designed to move upon focusing, it is then easy to reduce the size of the lens mount involved.

When there is such a zooming mode involved, it is preferable for the second lens group to have negative refracting power.

In view of making sure the angle of view and being fast, too, it is preferable to reduce the occurrence of aberrations with the first lens group and the second lens group. In the wide-angle state in particular, the negative power of the second lens group tends to grow strong, because the combined refracting power of the first lens group and the second lens group becomes negative. It is thus preferable that aberrations are well corrected at the second lens group.

In the invention, the first lens group is made up of, in order from its object side, one negative lens and one or two positive lenses.

This works for correction of chromatic aberrations or the like at the first lens group.

The second lens group is made up of, in order from its object side, the first negative meniscus lens convex on its object side, the second negative lens wherein the image side surface is larger in the absolute value of paraxial curvature than the object side surface, and the third positive lens wherein the object side surface is larger in the absolute value of paraxial curvature than the image side surface.

With the second lens group designed as mentioned above, refraction on a light beam per surface is eased.

And then, aberrations are cut down by configuring the second lens (the second negative lens) in the second lens group in such a way as to satisfy the following condition (2).

$$-1.3<(r_{2g3}+r_{2g4})/(r_{2g4}-r_{2g3})<-0.65 \quad (2)$$

Here, $r_{2g3}$ is the paraxial radius of curvature of the object side surface of the second negative lens in the second lens group, and $r_{2g4}$ is the paraxial radius of curvature of the image side surface of the second negative lens in the second lens group.

As the lower limit of −0.1 to condition (1) is not reached, it causes the amount of movement of the third lens group to become small, rendering it difficult to hold back fluctuations of aberrations with zooming. Exceeding the upper limit of 0.4 is not preferable, because there is a large change in the whole zoom lens length between the wide-angle end and the telephoto end, which will otherwise make the structure of the lens mount complicated and place the zoom lens in an ill-balanced state when it is in use.

At greater than the upper limit of −0.65 to condition (2), there are going to be too large higher-order aberrations produced, and at below the lower limit of −1.3, aberrations occurring at other surfaces are going to have more significant influences.

The aforesaid conditions and the conditions, mentioned later, are determined where the zoom lens is focused onto the farthest object.

It is further preferable to satisfy the following condition (A):

$$-3.0<m_{2ws}/m_{2st}<0 \quad (A)$$

where $m_{2ws}$ is the amount of movement of the second lens group at the wide-angle end in a state where there is a focal length defined by $0.442\times(f_w+f_t)$, with a plus sign indicative of a displacement of the second lens group toward the object side, and $m_{2st}$ is the amount of movement of the second lens group at the telephoto end in a state where there is a focal length defined by $0.442\times(f_w+f_t)$, with a plus sign indicative of a displacement of the second lens group toward the object side, where $f_w$ is the focal length of the whole zoom lens system at the wide-angle end.

Satisfaction of at least the lower limit of −3.0 to condition (A) makes it easy for the third lens group to share the load of zooming, and works for making sure the zoom ratio while aberrations are in a well-balanced state. Satisfaction of at least the upper limit of 0 makes it easy for the second lens group to have a function of correction of astigmatism in nearly the intermediate state due to its movement.

Yet further, it is preferable to satisfy the following condition (3).

$$1.6<\Sigma d_w/f_{bw}<2.2 \quad (3)$$

Here, $\Sigma d_w$ is the distance from the surface located to nearest to the object side in the first lens group to the surface located nearest to the image side in the third lens group as measured along the optical axis at the wide-angle end, and $f_{bw}$ is the distance from the surface located nearest to the image side in the third lens group to the focal point as measured along the optical axis at the wide-angle end.

It is preferable to satisfy at least one of the aforesaid conditions; however, it is more preferable to satisfy them at the same time.

Satisfaction of at least the lower limit of 1.6 to condition (3) works for making sure the amount of movement of the third lens group at the time of zooming, and satisfaction of at least the upper limit of 2.2 is preferable because the whole length of the zoom lens can be kept short at the wide-angle end.

Even more preferably, the following condition (4) should be satisfied.

$$0.5<m_1/f_t<0.9 \quad (4)$$

Here, $m_1$ is the amount of movement of the first lens group at the telephoto end with respect to the wide-angle end, with a plus sign indicative of a displacement of the first lens group toward the object side.

Satisfaction of at least the lower limit of 0.5 to condition (4) prevents the power of the first lens group from growing too strong, enabling the combined system of the first and second lens groups to easily have negative power at the wide-angle end. This also works for making sure the angle of view and the back focus by virtue of the retrofocus type function. Satisfaction of at least the upper limit of 0.9 makes sure the power of the first lens group, allowing the first and second lens group to easily implement zooming by a change in the space between them.

Even more preferably, the following condition (5) should be satisfied.

$$1.5<f_1/f_t<4 \quad (5)$$

Here $f_1$ is the focal length of the first lens group.

Being shy of the lower limit of 1.5 to condition (5) is not preferable for correction of aberrations, because with an effort to shorten the whole length of the zoom lens at the wide-angle end, the power of the second lens group grows too strong. Exceeding the upper limit of 4 is again not preferable in view of the construction of the lens mount, because there is an increased change in the whole length of the zoom lens from the wide-angle end to the telephoto end. This also causes the zoom lens to be thrown a lot more off balance when it is in use, impairing usability.

It is even more preferable for condition (5) to be satisfied simultaneously with condition (4).

It is even more preferable for conditions (3), (4) and (5) to be satisfied at the same time.

On the other hand, the third lens group should preferably be made up of, in order from its object side, a cemented lens, a single lens and a cemented lens, wherein each cemented lens comprises a positive lens and a negative lens.

The third lens group of such construction facilitates just only good correction of longitudinal chromatic aberration and spherical aberrations at the cemented lens on the object side but also correction at the cemented lens on the image side of off-axial aberrations remaining undercorrected at the first and the second lens group and chromatic aberration on the telephoto side. The positive lens sandwiched between two sets of cemented lenses is allowed to have a function of correcting higher-order aberrations less susceptible of correction at the cemented lenses.

Even preferably in this case, the following conditions (6) and (7) should be satisfied.

$$1.45 < n_{3g2} < 1.6 \tag{6}$$

$$77 < \nu_{3g3p} < 90 \tag{7}$$

Here, $n_{3g2}$ is the refractive index of the single lens in the third lens group, and $\nu_{3g3p}$ is the Abbe constant of all positive lenses included in the image side cemented lens in the third lens group.

Satisfaction of condition (7) permits good correction of chromatic aberrations. And then, if condition (6) is satisfied, it allows higher-order aberrations to occur in good amounts at the single lens thereby canceling out aberrations occurring at other lenses.

By complying with at least the lower limit of 77 to condition (7), dispersion is held back so that chromatic aberrations are readily correctable. Satisfaction of at least the upper limit of 90 easily gets rid of the influences of secondary spectra.

Satisfaction of at least the lower limit of 1.45 to condition (6) makes materials available, and satisfaction of at least the upper limit of 1.6 facilitates the occurrence of higher-order aberrations.

Even more preferably, the following condition (8) should be satisfied.

$$0.2 < n_{2g1} - n_{2g2} < 0.3 \tag{8}$$

Here, $n_{2g1}$ is the refractive index of the first negative lens in the second lens group, and $n_{2g2}$ is the refractive index of the second negative lens in the second lens group.

Condition (8) is provided to cause appropriate higher-order aberrations to occur at the second lens in the second lens group, thereby keeping the whole aberrations in balance. By complying with at least the lower limit of 0.2, the refractive index of the second lens (the second negative lens) with respect to the first lens (the first negative meniscus lens) is kept low in such a way as to impart a certain curvature to that surface to make appropriate higher-order aberrations likely to occur. Alternatively, by permitting the first lens to have a refractive index, the occurrence of excessive higher-order aberrations is avoided. By complying with at least the upper limit of 0.3, the amount of higher-order aberrations produced at the second lens is reduced down to an appropriate degree.

Even more preferably, the distance along the optical axis between the second lens group and the aperture stop, and between the aperture stop and the third lens group should be more shortened at the telephoto end than at the wide-angle end.

If this is done, the size of the lens group on the object side of the aperture stop, and on the image side can be kept so small that the exit pupil can be readily spaced away from the image plane. At the telephoto end, the distance between the second lens group and the third lens group can be more shortened, and this works for making sure the zoom ratio as desired.

Even more preferably, there should be a half angle of view of 35° to 45° at the wide-angle end and a zoom ratio of 2.5 to 4.

Thus, there can be a zoom lens achieved, which makes sure being fast as desired, and can take advantage of the function of the invention favorable for correction of off-axial aberrations.

Even more preferably, the respective conditions should have the following values.

Of condition (1), the lower, and the upper value should even more preferably be 0.0, and 0.2, esp., 0.08, respectively.

Of condition (2), the lower, and the upper value should even more preferably be −1.16, and −0.75, respectively.

Of condition (A), the lower, and the upper value should even more preferably be −1.0, esp., −0.8, and −0.01, esp., −0.03, respectively.

Of condition (3), the lower, and the upper value should even more preferably be 1.8, and 2.0, respectively.

Of condition (4), the lower, and the upper value should even more preferably be 0.55, and 0.7, respectively.

Of condition (5), the lower, and the upper value should even more preferably be 2.0, and 3.0, respectively.

Of condition (6), the lower, and the upper value should even more preferably be 1.50, and 1.58, respectively.

Of condition (7), the lower, and the upper value should even more preferably be 80, and 85, respectively.

Of condition (8), the lower, and the upper value should even more preferably be 0.23, and 0.27, respectively.

Thus, the present invention can provide a zoom lens that, albeit being simplified in construction, can make sure being fast and get around fluctuations of astigmatism with zooming. It is thus possible to provide a zoom that, albeit being a fast one, can easily take hold of the angle of view and the zoom ratio as desired.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
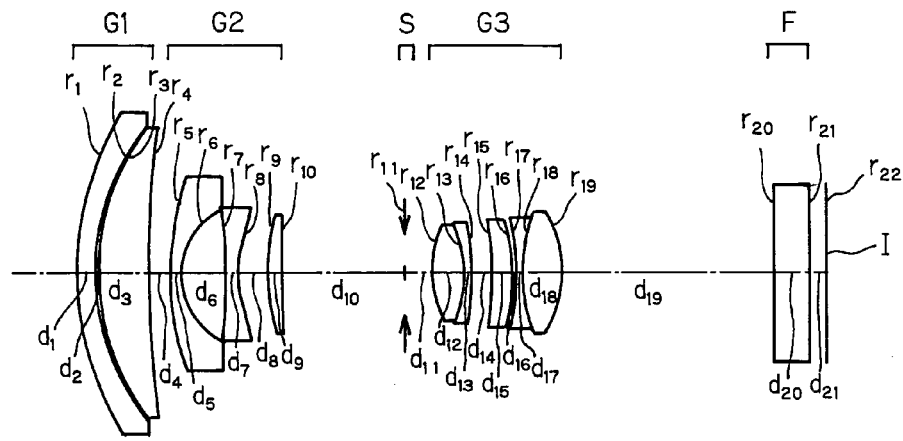
FIG. 1 is illustrative in section of Example 1 of the inventive zoom lens at the wide-angle end (a), in the intermediate state (b), and at the telephoto end (c).
Figure 1B:
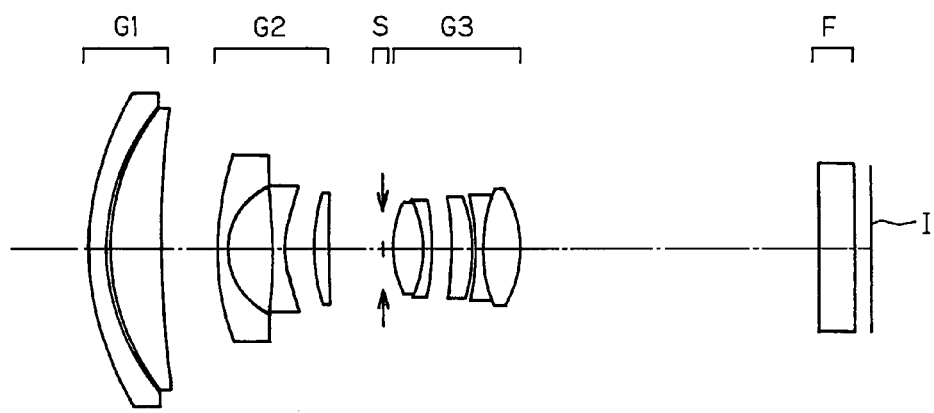
Figure 1C:
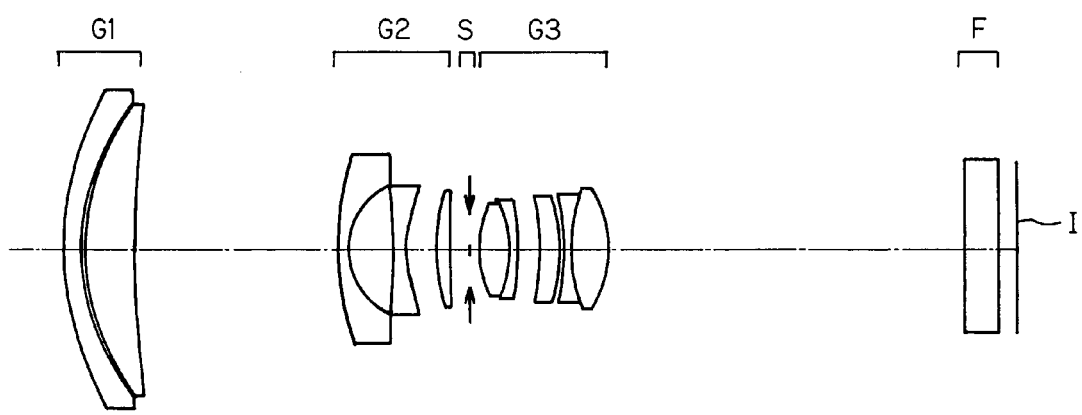
Figure 2A:
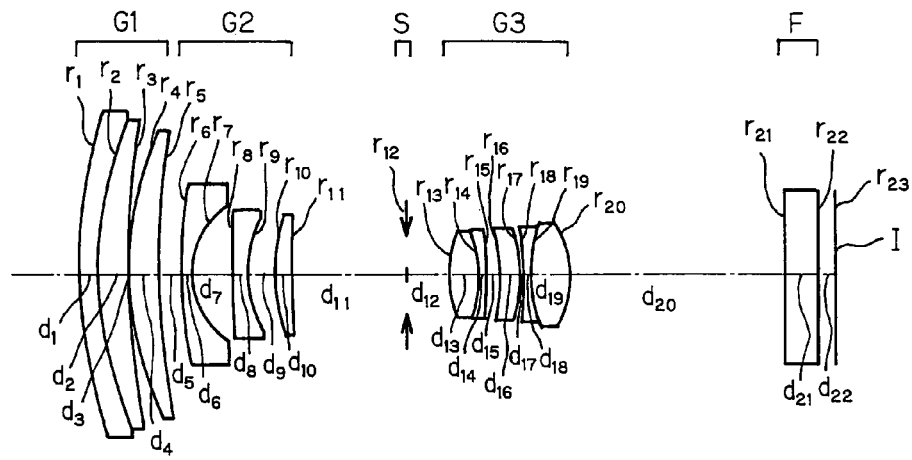
FIG. 2 is illustrative, as in FIG. 1, of Example 2 of the inventive zoom lens.
Figure 2B:
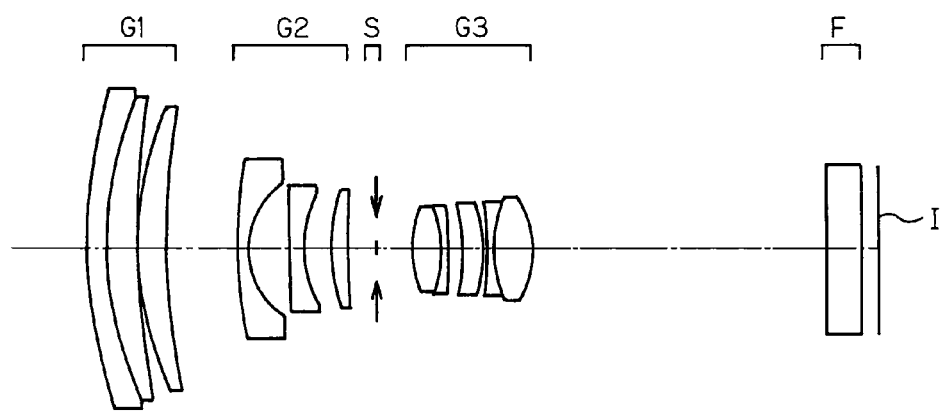
Figure 2C:
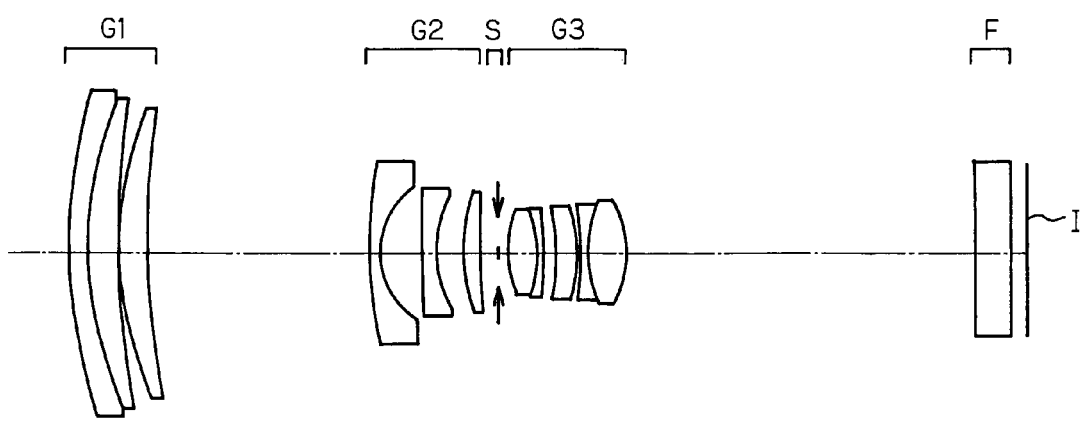
Figure 3A:
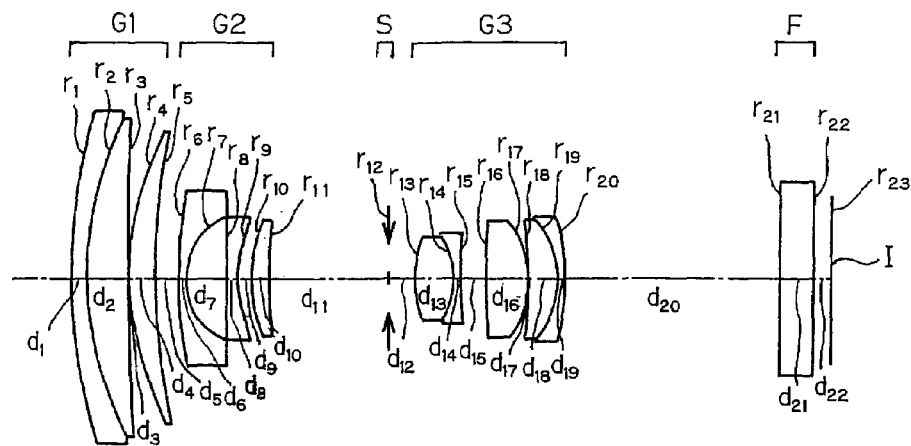
FIG. 3 is illustrative, as in FIG. 1, of Example 3 of the inventive zoom lens.
Figure 3B:
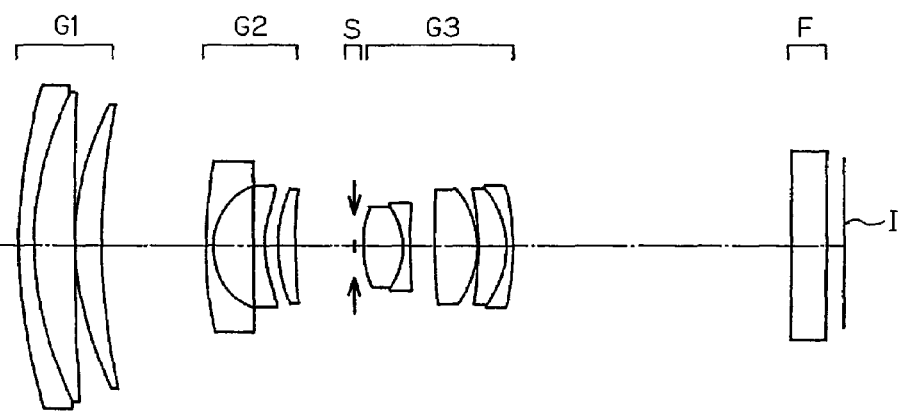
Figure 3C:
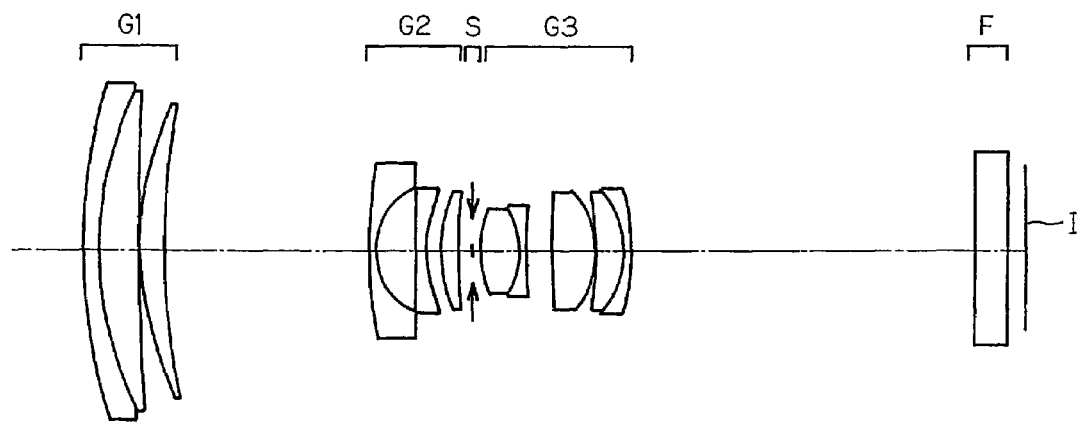

The zoom lens of the invention is now specifically explained with reference to Examples 1, 2 and 3. FIGS. 1, 2, and 3 is illustrative in section of Example 1, 2, and 3 at the wide-angle end (a), in the intermediate state (b) and at the telephoto end (c), respectively. Throughout FIGS. 1, 2 and 3, G1 stands for the first lens group; G2 the second lens group; S the aperture stop; G3 the third lens group; F one single plane-parallel plate for various filters (a low-pass filter, an infrared cut filter, a dustproof vibration filter, a CCD cover glass, etc.); and I the image plane (the light receiving plane of an electronic imaging device).

As shown in FIG. 1, Example 1 is directed to a zoom lens made up of, in order from its object side, the first lens group G1 of positive refracting power, the second lens group G2 of negative refracting power, the aperture stop S and the third lens group G3 of positive refracting power. Upon zooming from the wide-angle end to the telephoto end of the zoom lens, the first lens group G1 moves toward the object side in unison; the second lens group G2 moves toward the object side in unison and in a concave orbit while the space between it and the first lens group G1 becomes wide, and is positioned nearer to the object side at the telephoto end than at the wide-angle end; the aperture stop S moves toward the object side while the space between it and the second lens group G2 becomes narrow; and the third lens group G3 moves toward the object side in unison while the space between it and the aperture stop S becomes narrow.

In order from the object side of the zoom lens, the first lens group G1 is made up of a negative meniscus lens convex on its object side and a positive meniscus lens convex on its image side; the second lens group G2 is made up of a negative meniscus lens convex on its object side, a double-concave negative lens and a positive meniscus lens convex on its object side; and the third lens group G3 is made up of a cemented lens of a double-convex positive lens and a negative meniscus concave on its object side, a positive meniscus lens convex on its image side, and a cemented lens of a double-concave negative lens and a double-convex positive lens.

Four aspheric surfaces are used: two at both surfaces of the double-concave negative lens in the second lens group G2, one at the image side surface of the positive meniscus lens in the third lens group G3, and one at the surface located nearest to the object side of the image side cemented lens in the third lens group G3.

Focusing from a far object to a near object is implemented by movement of the second lens group G2 toward the object side.

As shown in FIG. 2, Example 2 is directed to a zoom lens made up of, in order from its object side, the first lens group G1 of positive refracting power, the second lens group G2 of negative refracting power, the aperture stop S and the third lens group G3 of positive refracting power. Upon zooming from the wide-angle end to the telephoto end of the zoom lens, the first lens group G1 moves toward the object side in unison; the second lens group G2 moves toward the object side in unison and in a concave orbit while the space between it and the first lens group G1 becomes wide, and is positioned nearer to the object side at the telephoto end than at the wide-angle end; the aperture stop S moves toward the object side while the space between it and the second lens group G2 becomes narrow; and the third lens group G3 moves toward the object side in unison while the space between it and the aperture stop S becomes narrow.

In order from the object side of the zoom lens, the first lens group G1 is made up of a cemented lens of a negative meniscus lens convex on its object side and a positive meniscus lens convex on its object side, and a positive meniscus lens convex on its object side; the second lens group G2 is made up of a negative meniscus lens convex on its object side, a negative meniscus lens convex on its object side and a positive meniscus lens convex on its object side; and the third lens group G3 is made up of a cemented lens of a double-convex positive lens and a negative meniscus concave on its object side, a positive meniscus lens convex on its image side, and a cemented lens of a double-concave negative lens and a double-convex positive lens.

Four aspheric surfaces are used: two at both surfaces of the second negative meniscus lens in the second lens group G2, and two at both surfaces of the positive meniscus lens in the third lens group G3.

Focusing from a far object to a near object is implemented by movement of the second lens group G2 toward the object side.

As shown in FIG. 3, Example 3 is directed to a zoom lens made up of, in order from its object side, the first lens group G1 of positive refracting power, the second lens group G2 of negative refracting power, the aperture stop S and the third lens group G3 of positive refracting power. Upon zooming from the wide-angle end to the telephoto end of the zoom lens, the first lens group G1 moves toward the object side in unison; the second lens group G2 moves toward the object side in unison and in a concave orbit while the space between it and the first lens group G1 becomes wide, and is positioned nearer to the object side at the telephoto end than at the wide-angle end; the aperture stop S moves toward the object side while the space between it and the second lens group G2 becomes narrow; and the third lens group G3 moves toward the object side in unison while the space between it and the aperture stop S becomes narrow.

In order from the object side of the zoom lens, the first lens group G1 is made up of a cemented lens of a negative meniscus lens convex on its object side and a positive meniscus lens convex on its object side, and a positive meniscus lens convex on its object side; the second lens group G2 is made up of a negative meniscus lens convex on its object side, a negative meniscus lens convex on its object side and a positive meniscus lens convex on its object side; and the third lens group G3 is made up of a cemented lens of a double-convex positive lens and a double-concave negative lens, a double-convex positive lens, and a cemented lens of a positive meniscus lens convex on its image side and a negative meniscus lens convex on its image side.

Four aspheric surfaces are used: two at both surfaces of the second negative meniscus lens in the second lens group G2, as counted from its object side, and two at both surfaces of the double-convex positive lens in the third lens group G3.

Focusing from a far object to a near object is implemented by movement of the second lens group G2 toward the object side.

Set out below are the numerical data on the aforesaid respective examples. Symbols used hereinafter but not hereinbefore have the following meanings:

f: the focal length of the whole zoom lens system;
$F_{NO}$: F-number,
ω: half angle of view,
WE: the wide-angle end,
ST: the intermediate state;
TE: the telephoto end,
$r_1, r_2, \ldots$: the radius of curvature of each lens surface,
$d_1, d_2, \ldots$: the space between adjacent lens surface,
$n_{d1}, n_{d2}, \ldots$: the d-line refractive index of each lens, and
$\nu_{d1}, \nu_{d2}, \ldots$: the Abbe constant of each lens.

Note here that OD is a subject distance as measured from the image plane. Let x be an optical axis with the proviso that the direction of travel of light is positive, and y be a direction orthogonal to the optical axis. Then, aspheric configuration is given by:

$$x = (y^2/r)/[1+\{1-(K+1)(y/r)^2\}^{1/2}] + A_4 y^4 + A_6 y^6 + A_8 y^8$$

Here r is a paraxial radius of curvature, K is a conical constant, and $A_4$, $A_6$ and $A_8$ are the $4^{th}$, $6^{th}$, and $8^{th}$-order

EXAMPLE 1

| | | | |
|---|---|---|---|
| $r_1 = 40.27$ | $d_1 = 2.40$ | $n_{d1} = 1.81$ | $\nu_{d1} = 25.43$ |
| $r_2 = 30.44$ | $d_2 = 0.44$ | | |
| $r_3 = 31.17$ | $d_3 = 6.70$ | $n_{d2} = 1.60$ | $\nu_{d2} = 60.64$ |
| $r_4 = 141.22$ | $d_4 = $ (Variable) | | |
| $r_5 = 40.22$ | $d_5 = 1.30$ | $n_{d3} = 1.79$ | $\nu_{d3} = 47.37$ |
| $r_6 = 9.50$ | $d_6 = 5.77$ | | |
| $r_7 = -129.31$(Aspheric) | $d_7 = 1.78$ | $n_{d4} = 1.53$ | $\nu_{d4} = 55.78$ |
| $r_8 = 15.15$(Aspheric) | $d_8 = 3.83$ | | |
| $r_9 = 27.46$ | $d_9 = 1.85$ | $n_{d5} = 1.85$ | $\nu_{d5} = 23.78$ |
| $r_{10} = 126.31$ | $d_{10} = $ (Variable) | | |
| $r_{11} = \infty$ (Stop) | $d_{11} = $ (Variable) | | |
| $r_{12} = 14.35$ | $d_{12} = 4.20$ | $n_{d6} = 1.53$ | $\nu_{d6} = 48.84$ |
| $r_{13} = -14.35$ | $d_{13} = 0.99$ | $n_{d7} = 1.77$ | $\nu_{d7} = 49.60$ |
| $r_{14} = -35.21$ | $d_{14} = 2.83$ | | |
| $r_{15} = -42.33$ | $d_{15} = 2.85$ | $n_{d8} = 1.53$ | $\nu_{d8} = 55.78$ |
| $r_{16} = -20.17$(Aspheric) | $d_{16} = 0.40$ | | |
| $r_{17} = -36.95$(Aspheric) | $d_{17} = 1.00$ | $n_{d9} = 1.90$ | $\nu_{d9} = 31.31$ |
| $r_{18} = 21.40$ | $d_{18} = 5.25$ | $n_{d10} = 1.50$ | $\nu_{d10} = 81.54$ |
| $r_{19} = -14.58$ | $d_{19} = $ (Variable) | | |
| $r_{20} = \infty$ | $d_{20} = 4.57$ | $n_{d11} = 1.52$ | $\nu_{d11} = 64.14$ |
| $r_{21} = \infty$ | $d_{21} = 2.42$ | | |
| $r_{22} = \infty$(Imaging plane) | | | |

Aspherical Coefficients

7th surface

K = 0.00
$A_4 = -2.44 \times 10^{-5}$
$A_6 = -3.98 \times 10^{-7}$
$A_8 = 9.73 \times 10^{-10}$ 8th surface K = 0.00
$A_4 = -1.12 \times 10^{-4}$
$A_6 = -1.11 \times 10^{-6}$
$A_8 = 3.39 \times 10^{-9}$ 16th surface K = 0.00
$A_4 = -1.02 \times 10^{-4}$
$A_6 = 1.09 \times 10^{-6}$
$A_8 = 9.76 \times 10^{-9}$ 17th surface K = −2.23
$A_4 = 1.66 \times 10^{-6}$
$A_6 = 1.09 \times 10^{-6}$
$A_8 = 1.13 \times 10^{-8}$

| | WE | ST | TE |
|---|---|---|---|
| Zooming Data (OD = ∞) | | | |
| f (mm) | 14.3 | 24.5 | 41.2 |
| $F_{NO}$ | 3.57 | 4.80 | 5.70 |
| ω (°) | 40.0 | 25.4 | 15.6 |
| $d_4$ | 2.93 | 7.62 | 27.22 |
| $d_{10}$ | 16.55 | 7.28 | 2.60 |
| $d_{11}$ | 3.90 | 1.27 | 1.20 |
| $d_{19}$ | 28.25 | 39.98 | 47.96 |
| (OD = 250 mm) | | | |
| $d_4$ | 1.09 | 5.60 | 24.10 |
| $d_{10}$ | 18.39 | 9.30 | 5.72 |
| $d_{11}$ | 3.90 | 1.27 | 1.20 |
| $d_{19}$ | 28.25 | 39.98 | 47.96 |

EXAMPLE 2

| | | | |
|---|---|---|---|
| $r_1 = 70.91$ | $d_1 = 2.40$ | $n_{d1} = 1.81$ | $\nu_{d1} = 25.43$ |
| $r_2 = 49.17$ | $d_2 = 4.02$ | $n_{d2} = 1.52$ | $\nu_{d2} = 64.20$ |
| $r_3 = 116.84$ | $d_3 = 0.15$ | | |
| $r_4 = 44.85$ | $d_4 = 3.85$ | $n_{d3} = 1.60$ | $\nu_{d3} = 60.64$ |
| $r_5 = 103.04$ | $d_5 = $ (Variable) | | |
| $r_6 = 61.14$ | $d_6 = 1.30$ | $n_{d4} = 1.79$ | $\nu_{d4} = 47.37$ |
| $r_7 = 10.29$ | $d_7 = 5.48$ | | |
| $r_8 = 662.61$(Aspheric) | $d_8 = 1.94$ | $n_{d5} = 1.53$ | $\nu_{d5} = 55.78$ |
| $r_9 = 13.99$(Aspheric) | $d_9 = 3.62$ | | |
| $r_{10} = 24.57$ | $d_{10} = 2.16$ | $n_{d6} = 1.85$ | $\nu_{d6} = 23.78$ |
| $r_{11} = 103.08$ | $d_{11} = $ (Variable) | | |
| $r_{12} = \infty$ (Stop) | $d_{12} = $ (Variable) | | |
| $r_{13} = 13.28$ | $d_{13} = 4.08$ | $n_{d7} = 1.55$ | $\nu_{d7} = 45.79$ |
| $r_{14} = -16.05$ | $d_{14} = 0.99$ | $n_{d8} = 1.77$ | $\nu_{d8} = 49.60$ |
| $r_{15} = -52.76$ | $d_{15} = 1.70$ | | |
| $r_{16} = -34.65$(Aspheric) | $d_{16} = 2.85$ | $n_{d9} = 1.53$ | $\nu_{d9} = 55.78$ |
| $r_{17} = -20.34$(Aspheric) | $d_{17} = 0.40$ | | |
| $r_{18} = -47.88$ | $d_{18} = 1.00$ | $n_{d10} = 1.90$ | $\nu_{d10} = 31.31$ |
| $r_{19} = 16.49$ | $d_{19} = 5.21$ | $n_{d11} = 1.50$ | $\nu_{d11} = 81.54$ |
| $r_{20} = -13.66$ | $d_{20} = $ (Variable) | | |
| $r_{21} = \infty$ | $d_{21} = 4.57$ | $n_{d12} = 1.52$ | $\nu_{d12} = 64.14$ |
| $r_{22} = \infty$ | $d_{22} = 2.42$ | | |
| $r_{23} = \infty$(Imaging plane) | | | |

Aspherical Coefficients

8th surface

K = 0.00
$A_4 = 6.22 \times 10^{-5}$
$A_6 = -1.10 \times 10^{-6}$
$A_8 = 5.60 \times 10^{-9}$ 9th surface K = 0.00
$A_4 = -3.21 \times 10^{-5}$
$A_6 = -1.80 \times 10^{-6}$
$A_8 = 5.45 \times 10^{-9}$ 16th surface K = 0.00
$A_4 = -1.13 \times 10^{-4}$
$A_6 = 1.06 \times 10^{-6}$
$A_8 = 1.46 \times 10^{-8}$ 17th surface K = −1.36
$A_4 = 1.75 \times 10^{-5}$ -continued $A_6 = 9.41 \times 10^{-7}$
$A_8 = 1.48 \times 10^{-8}$

|  | WE | ST | TE |
|---|---|---|---|
| Zooming Data (OD = ∞) | | | |
| f (mm) | 14.3 | 24.5 | 41.2 |
| $F_{NO}$ | 3.56 | 4.80 | 5.76 |
| ω (°) | 40.1 | 25.4 | 15.7 |
| $d_5$ | 3.10 | 9.46 | 29.62 |
| $d_{11}$ | 15.42 | 3.74 | 2.30 |
| $d_{12}$ | 5.53 | 4.91 | 1.20 |
| $d_{20}$ | 28.46 | 39.22 | 46.87 |
| (OD = 250 mm) | | | |
| $d_5$ | 1.07 | 7.18 | 26.14 |
| $d_{11}$ | 17.45 | 6.02 | 5.78 |
| $d_{12}$ | 5.53 | 4.91 | 1.20 |
| $d_{20}$ | 28.46 | 39.22 | 46.87 |

EXAMPLE 3

$r_1 = 77.18$    $d_1 = 2.00$        $n_{d1} = 1.81$   $v_{d1} = 25.43$
$r_2 = 47.13$    $d_2 = 5.44$        $n_{d2} = 1.52$   $v_{d2} = 64.20$
$r_3 = 437.08$   $d_3 = 0.13$
$r_4 = 43.54$    $d_4 = 3.35$        $n_{d3} = 1.60$   $v_{d3} = 60.64$
$r_5 = 92.64$    $d_5$ = (Variable)
$r_6 = 64.17$    $d_6 = 0.95$        $n_{d4} = 1.77$   $v_{d4} = 49.60$
$r_7 = 9.22$     $d_7 = 5.26$
$r_8 = 208.46$(Aspheric)   $d_8 = 1.50$   $n_{d5} = 1.53$   $v_{d5} = 55.78$
$r_9 = 14.64$(Aspheric)    $d_9 = 2.03$
$r_{10} = 20.26$    $d_{10} = 2.29$    $n_{d6} = 1.85$   $v_{d6} = 23.78$
$r_{11} = 64.08$    $d_{11}$ = (Variable)
$r_{12} = \infty$ (Stop)   $d_{12}$ = (Variable)
$r_{13} = 15.46$    $d_{13} = 5.09$    $n_{d7} = 1.52$   $v_{d7} = 52.43$
$r_{14} = -11.06$   $d_{14} = 1.00$    $n_{d8} = 1.74$   $v_{d8} = 52.64$
$r_{15} = 129.25$   $d_{15} = 3.18$
$r_{16} = 64.86$(Aspheric)   $d_{16} = 5.76$   $n_{d9} = 1.53$   $v_{d9} = 55.78$
$r_{17} = -12.21$(Aspheric)  $d_{17} = 0.15$
$r_{18} = -41.57$   $d_{18} = 3.61$    $n_{d10} = 1.50$   $v_{d10} = 81.54$
$r_{19} = -12.31$   $d_{19} = 0.98$    $n_{d11} = 1.81$   $v_{d11} = 25.42$
$r_{20} = -30.58$   $d_{20}$ = (Variable)
$r_{21} = \infty$   $d_{21} = 4.57$    $n_{d12} = 1.52$   $v_{d12} = 64.14$
$r_{22} = \infty$   $d_{22} = 2.42$
$r_{23} = \infty$(Imaging plane)

Aspherical Coefficients

8th surface $K = 0$
$A_4 = 1.99 \times 10^{-5}$
$A_6 = -6.87 \times 10^{-7}$
$A_8 = 9.38 \times 10^{-10}$ 9th surface $K = 0$
$A_4 = -7.47 \times 10^{-5}$
$A_6 = -1.48 \times 10^{-6}$
$A_8 = -8.81 \times 10^{-10}$ 16th surface $K = 0$
$A_4 = -6.79 \times 10^{-5}$
$A_6 = 4.96 \times 10^{-8}$
$A_8 = -1.46 \times 10^{-9}$ 17th surface $K = 0$
$A_4 = 3.33 \times 10^{-5}$
$A_6 = 1.21 \times 10^{-7}$
$A_8 = 8.74 \times 10^{-10}$ -continued

|  | WE | ST | TE |
|---|---|---|---|
| Zooming Data (OD = ∞) | | | |
| f (mm) | 14.2 | 24.5 | 41.2 |
| $F_{NO}$ | 3.54 | 4.82 | 5.47 |
| ω (°) | 40.4 | 25.3 | 15.7 |
| $d_5$ | 3.14 | 13.75 | 26.99 |
| $d_{11}$ | 15.59 | 7.76 | 2.00 |
| $d_{12}$ | 3.62 | 1.25 | 1.13 |
| $d_{20}$ | 28.53 | 37.06 | 45.50 |
| (OD = 250 mm) | | | |
| $d_5$ | 1.27 | 11.34 | 23.50 |
| $d_{11}$ | 17.46 | 10.18 | 5.49 |
| $d_{12}$ | 3.62 | 1.25 | 1.13 |
| $d_{20}$ | 28.53 | 37.06 | 45.50 |

Figure 4A:
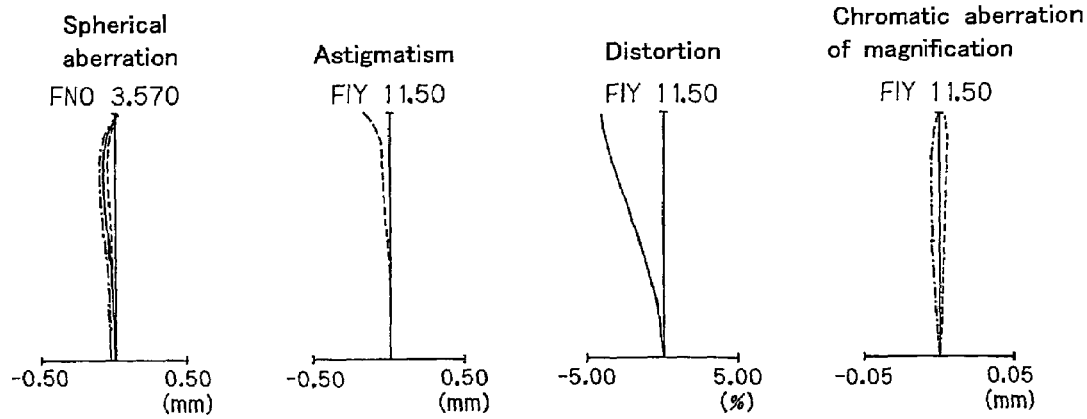
FIG. 4 is an aberration diagram for Example 1 upon focusing on an infinite object point.
Figure 4B:
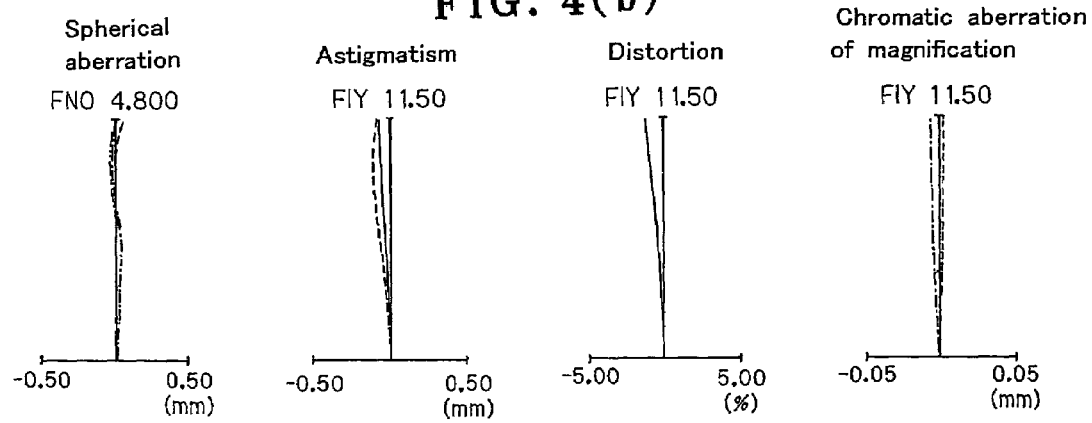
Figure 4C:
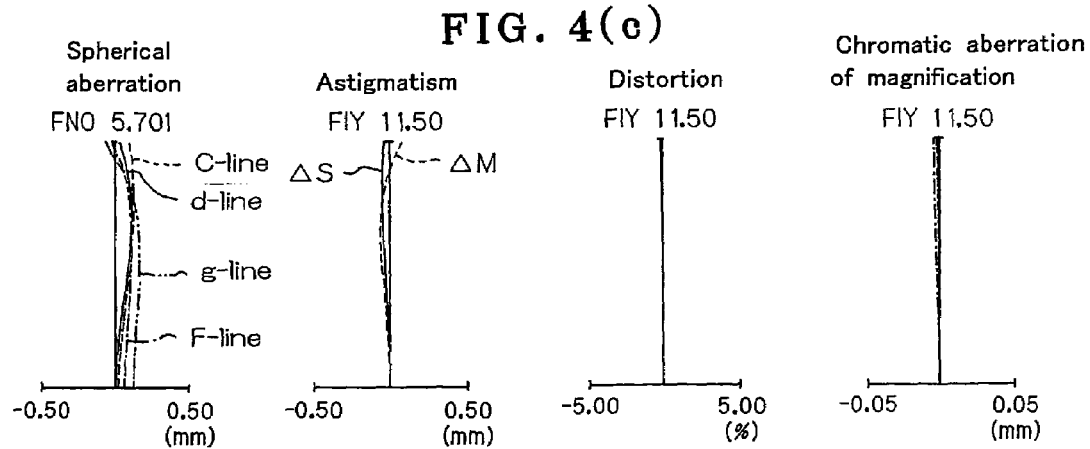
Figure 5A:
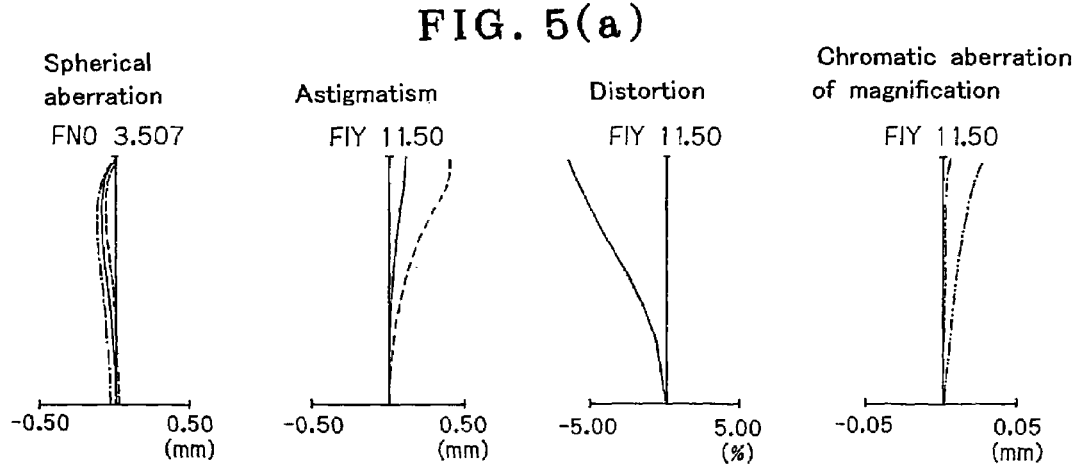
FIG. 5 is an aberration diagram for Example 1 at a subject distance of 250 mm.
Figure 5B:
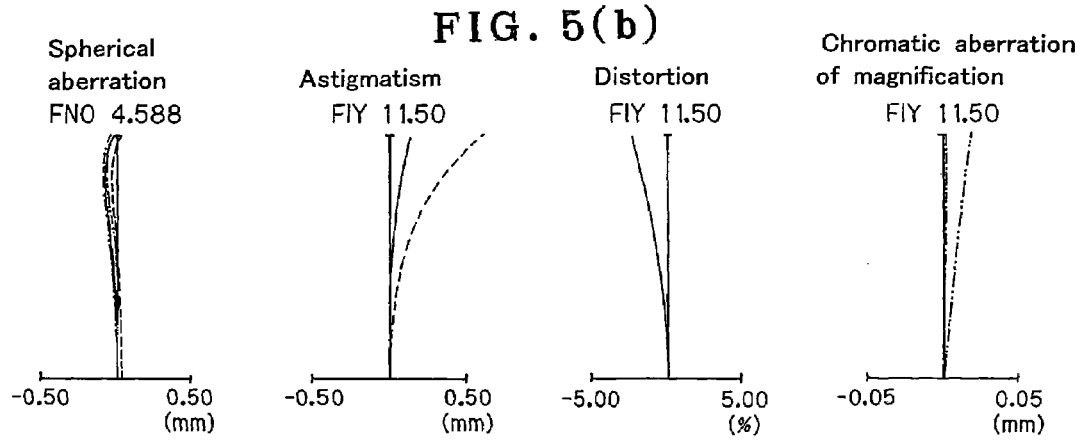
Figure 5C:
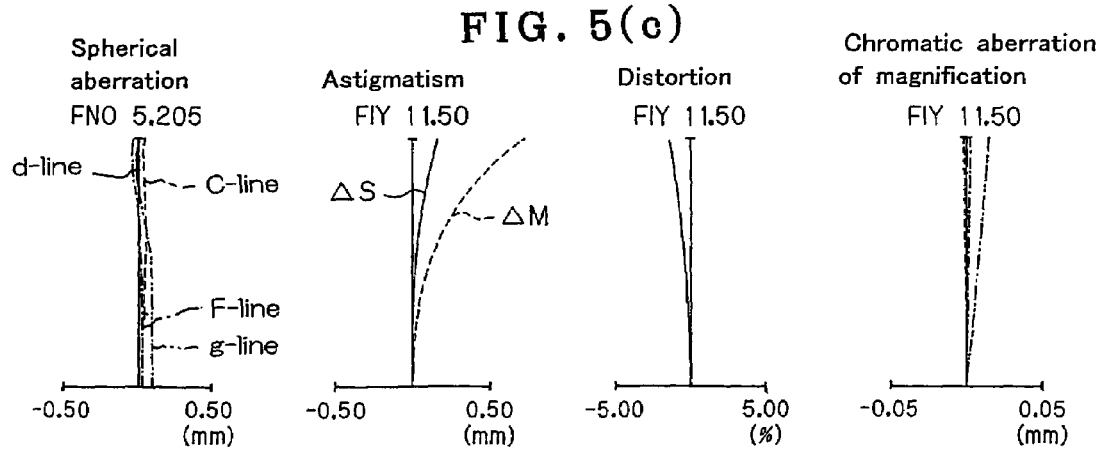
Figure 6A:
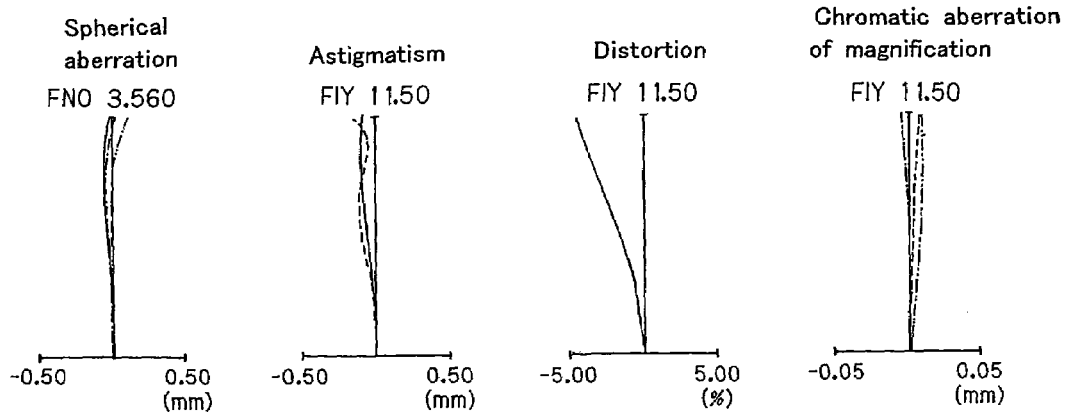
FIG. 6 is an aberration diagram for Example 2 upon focusing on an infinite object point.
Figure 6B:
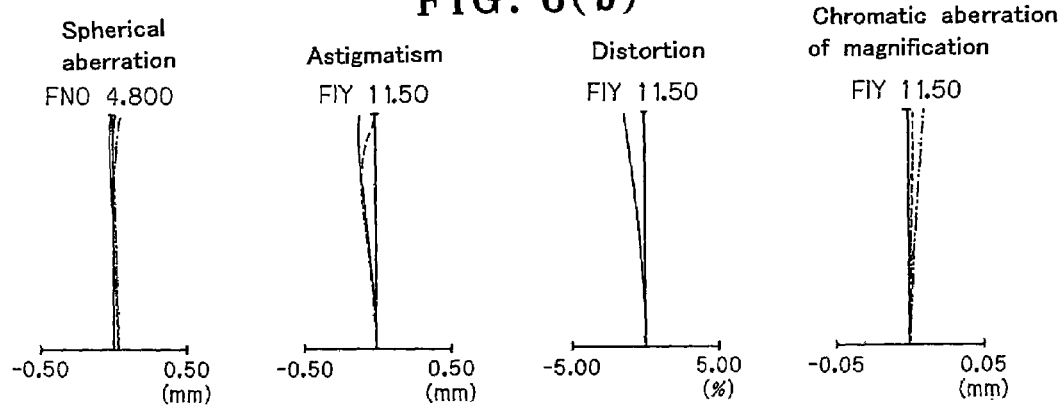
Figure 6C:
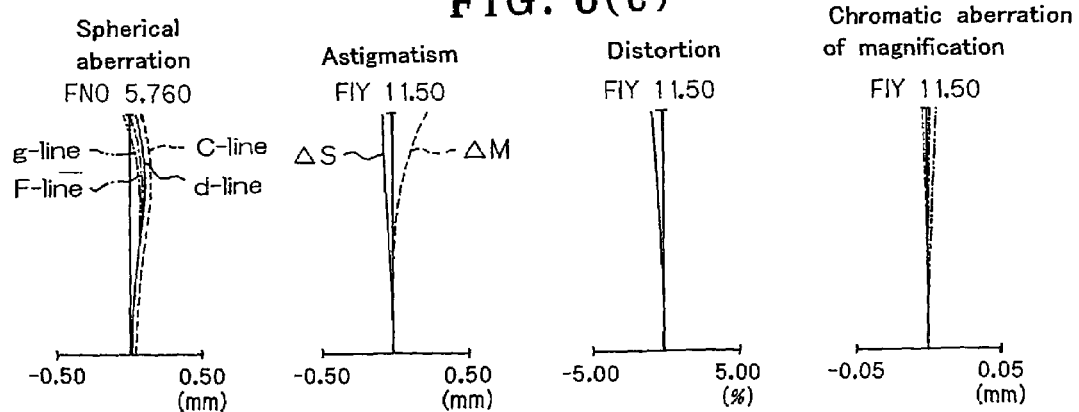
Figure 7A:
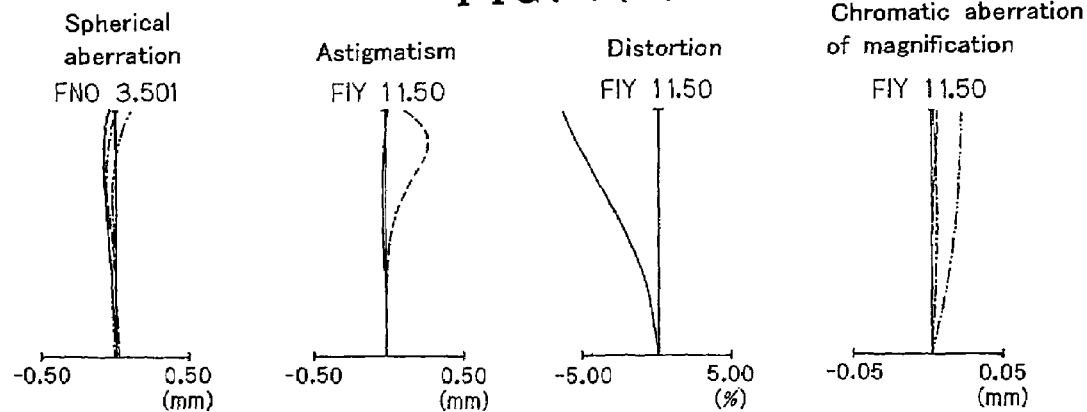
FIG. 7 is an aberration diagram for Example 2 at a subject distance of 250 mm.
Figure 7B:
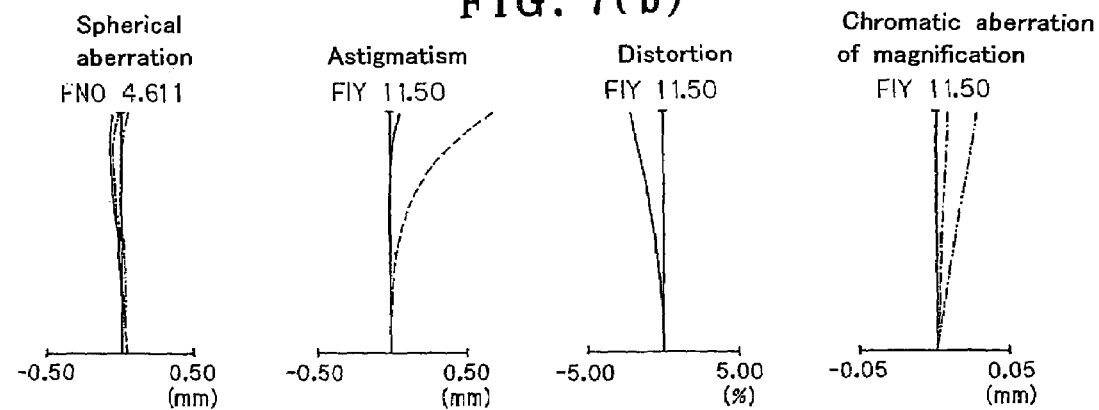
Figure 7C:
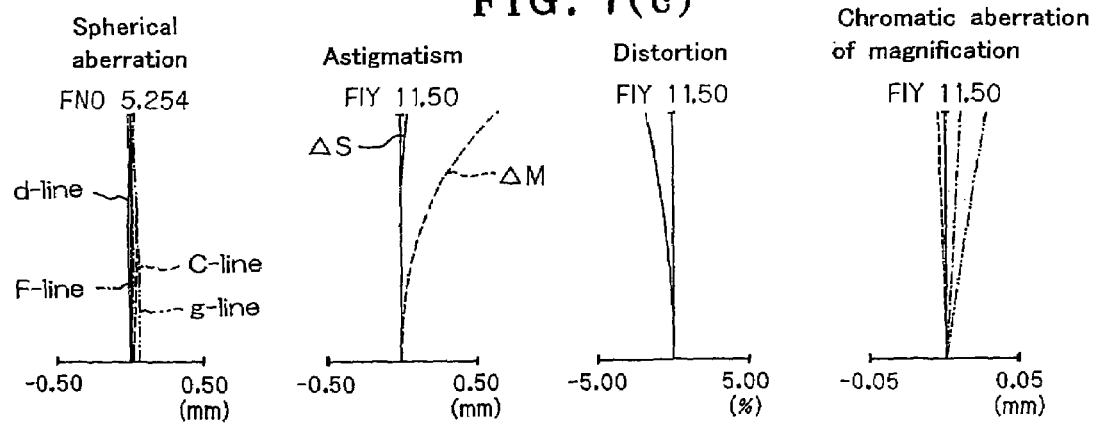
Figure 8A:
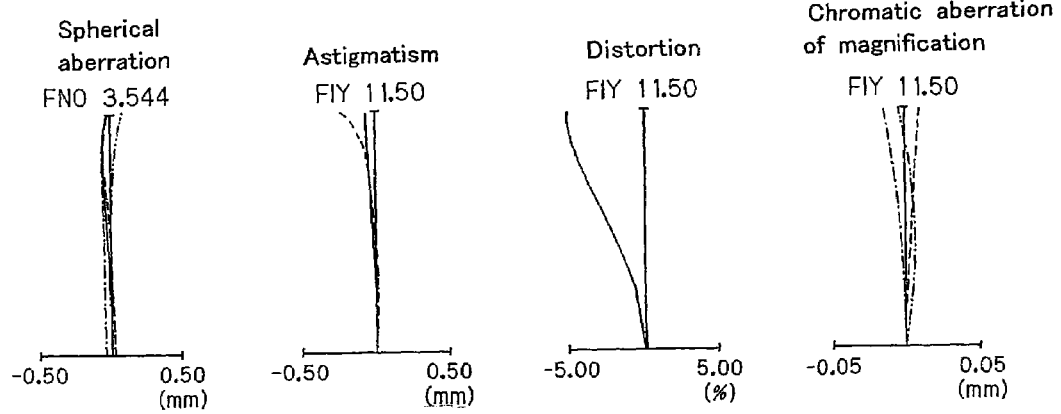
FIG. 8 is an aberration diagram for Example 3 upon focusing on an infinite object point.
Figure 8B:
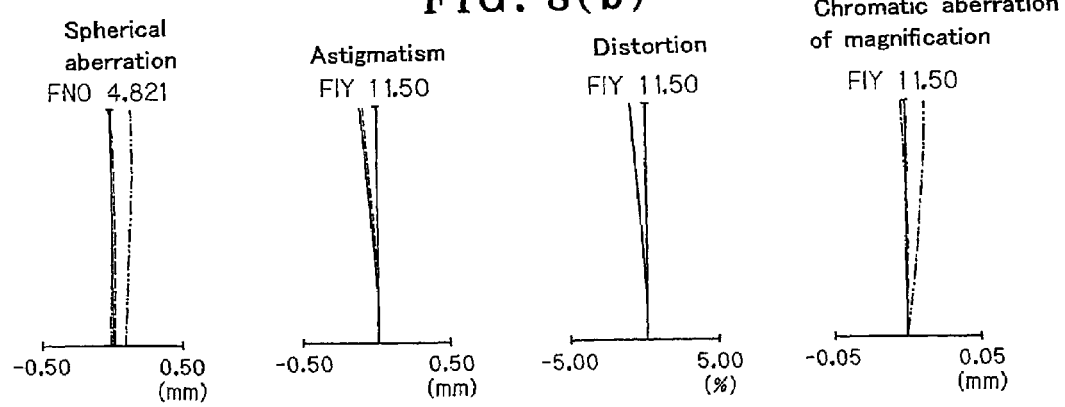
Figure 8C:
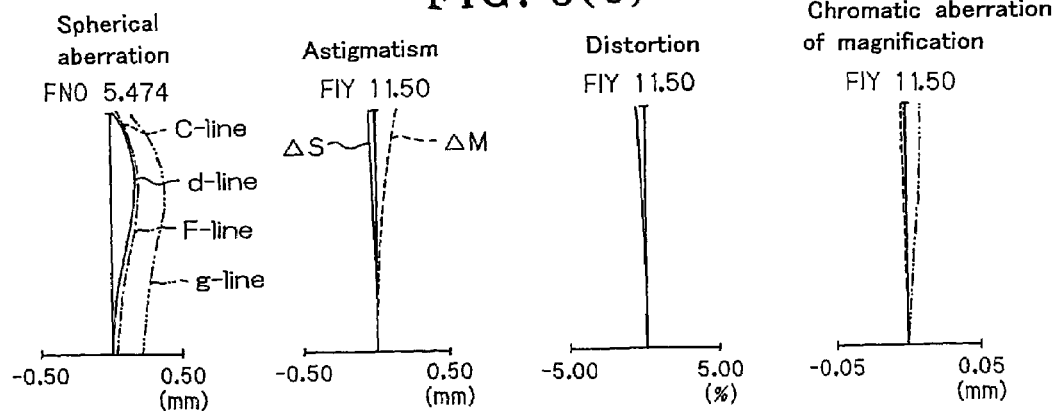
Figure 9A:
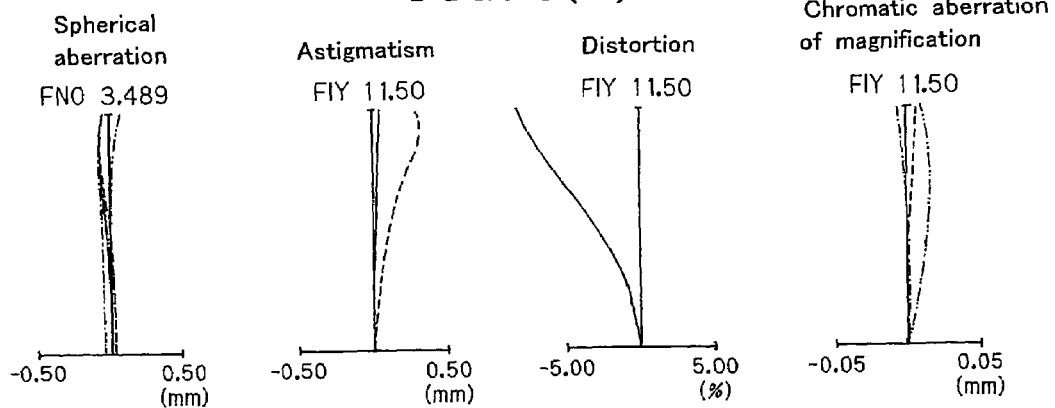
FIG. 9 is an aberration diagram for Example 3 at a subject distance of 250 mm.
Figure 9B:
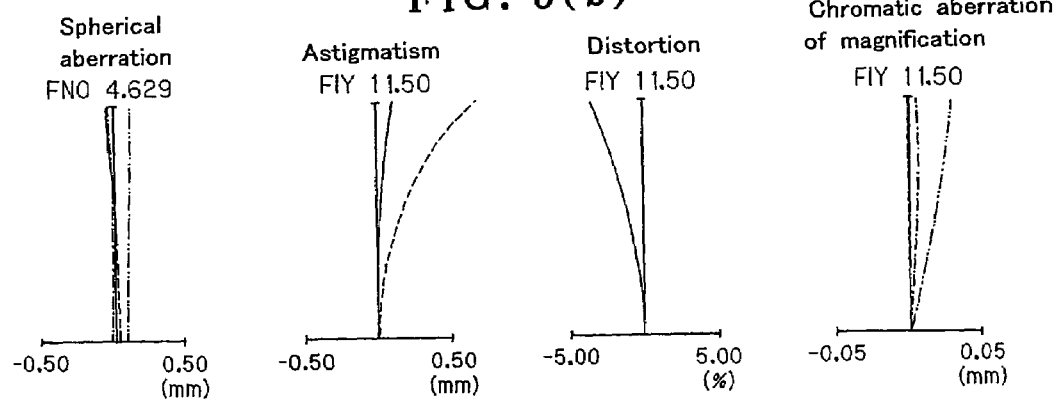
Figure 9C:
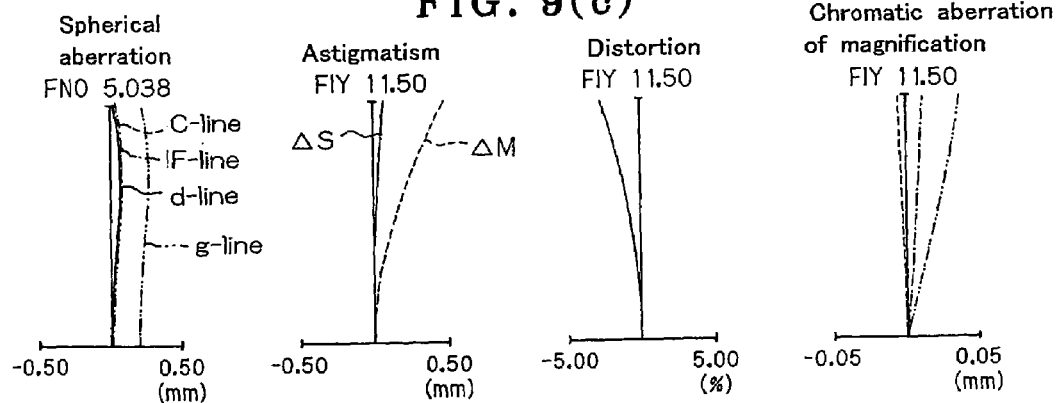
Figure 10A:
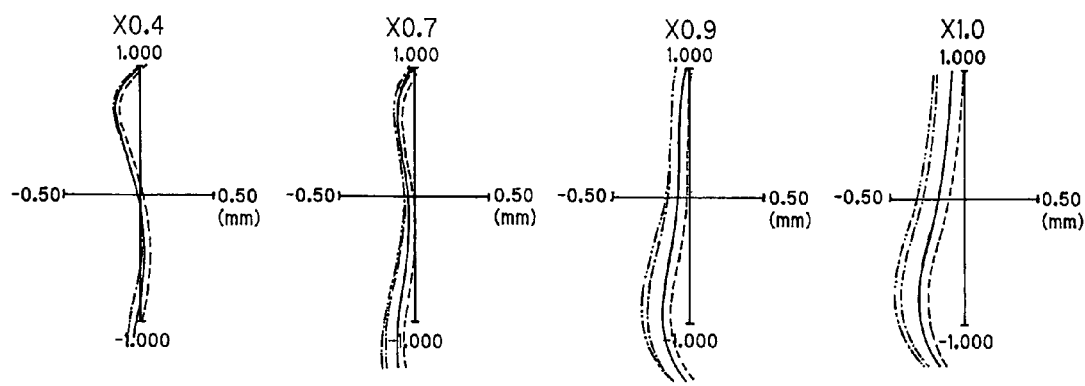
FIG. 10 is a transverse aberration diagram for Example 1 upon focusing on an infinite object point.
Figure 10B:
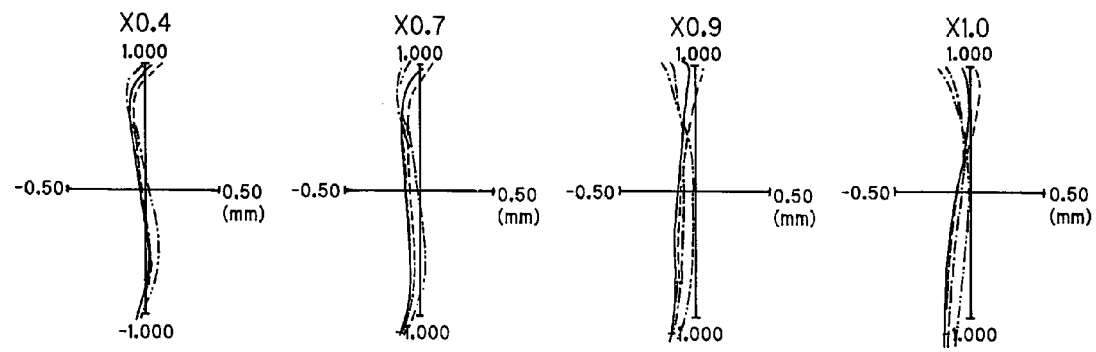
Figure 10C:
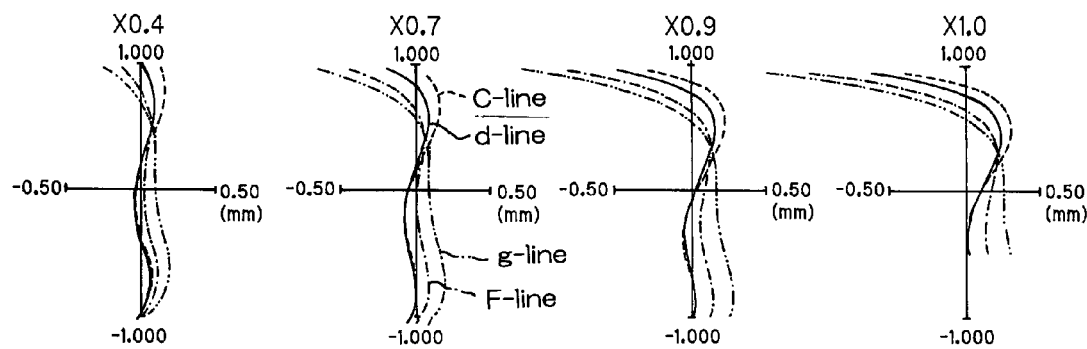
Figure 11A:
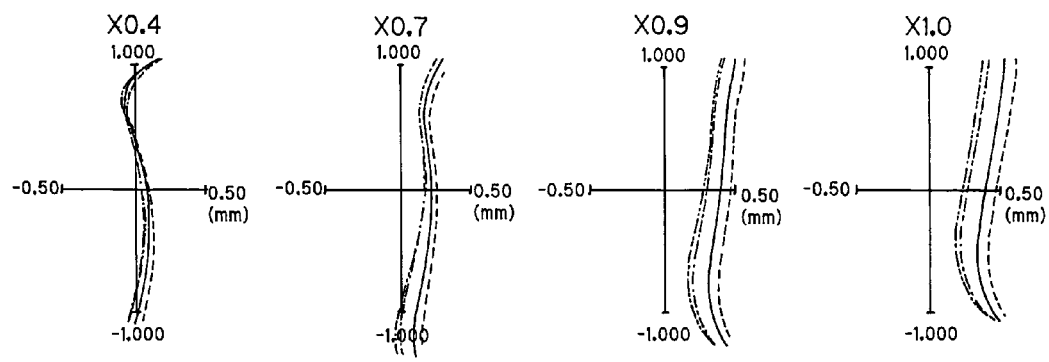
FIG. 11 is a transverse aberration diagram for Example 1 at a subject distance of 250 mm.
Figure 11B:
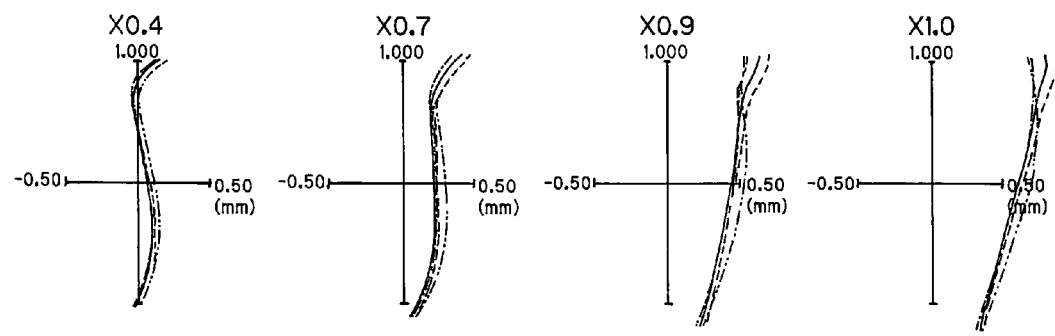
Figure 11C:
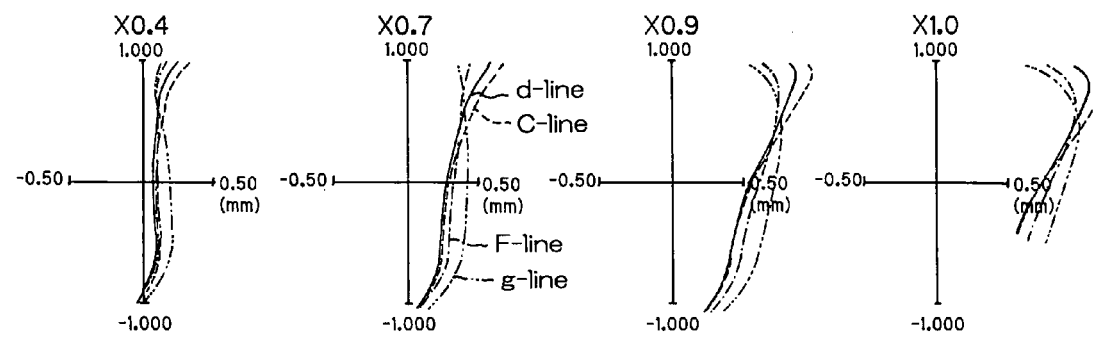
Figure 12A:
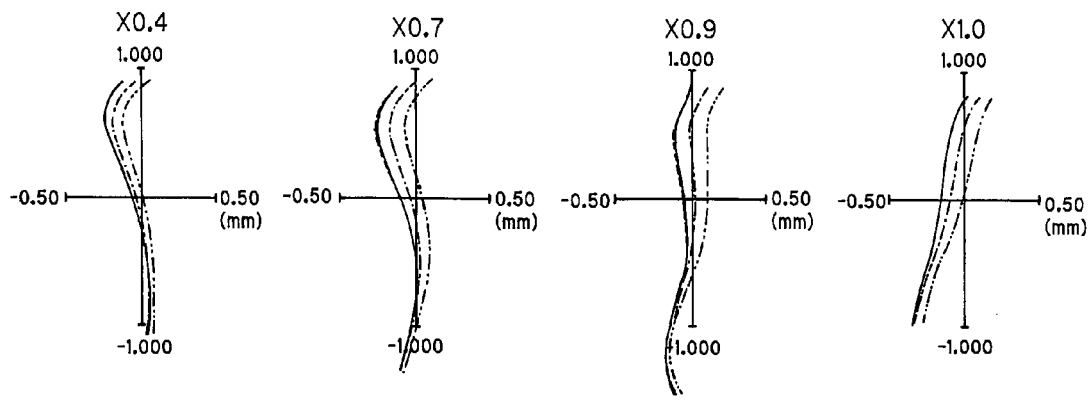
FIG. 12 is a transverse aberration diagram for Example 2 upon focusing on an infinite object point.
Figure 12B:
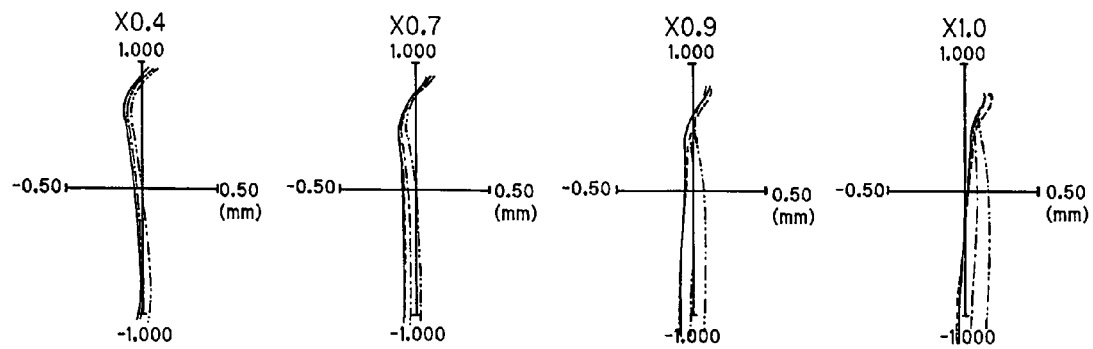
Figure 12C:
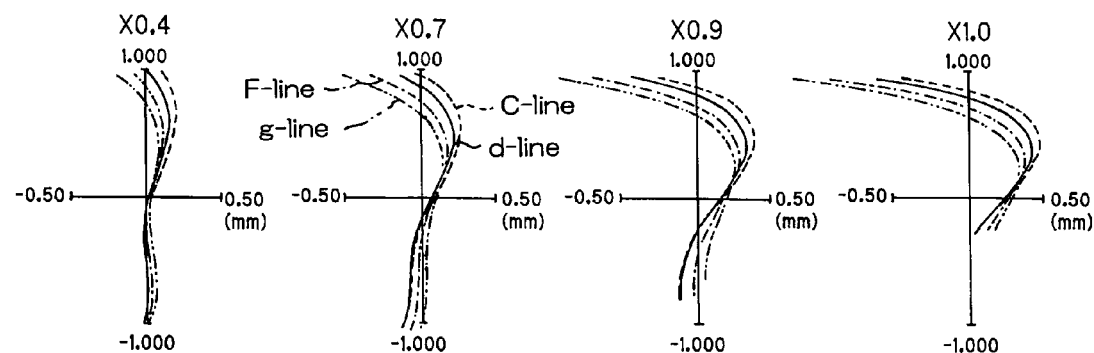
Figure 13A:
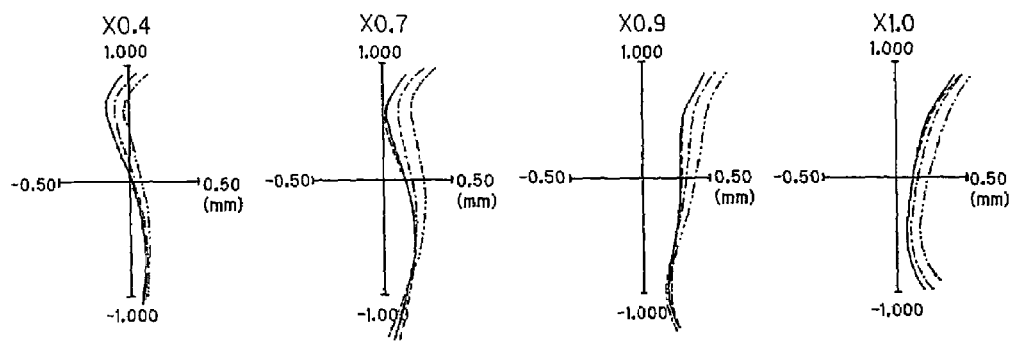
FIG. 13 is a transverse aberration diagram for Example 2 at a subject distance of 250 mm.
Figure 13B:
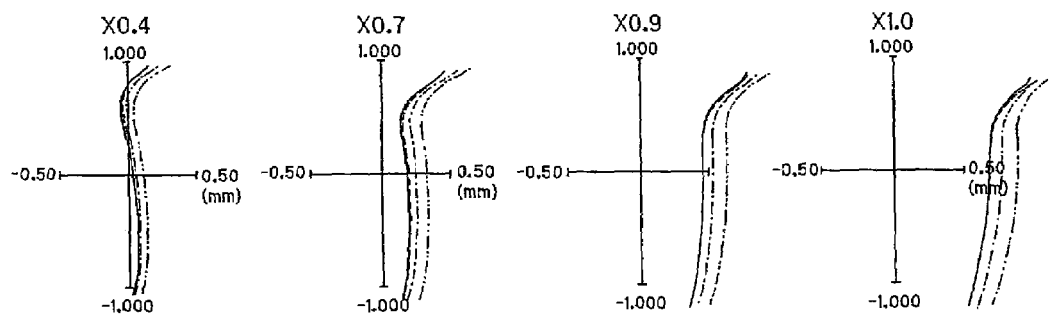
Figure 13C:
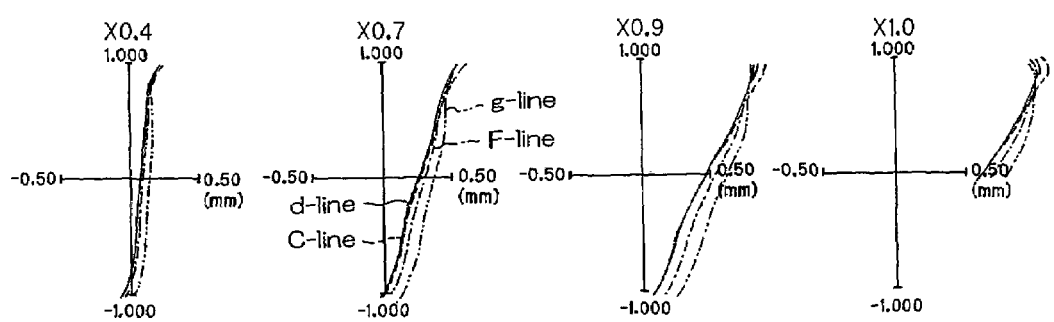
Figure 14A:
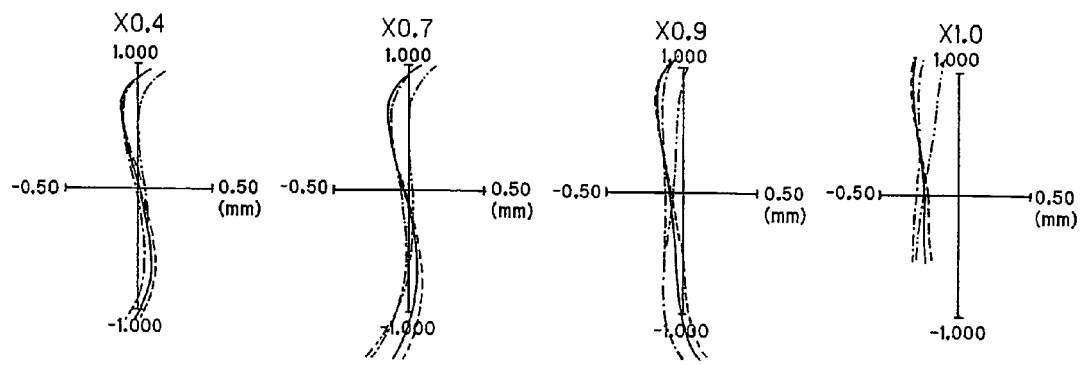
FIG. 14 is a transverse aberration diagram for Example 3 upon focusing on an infinite object point.
Figure 14B:
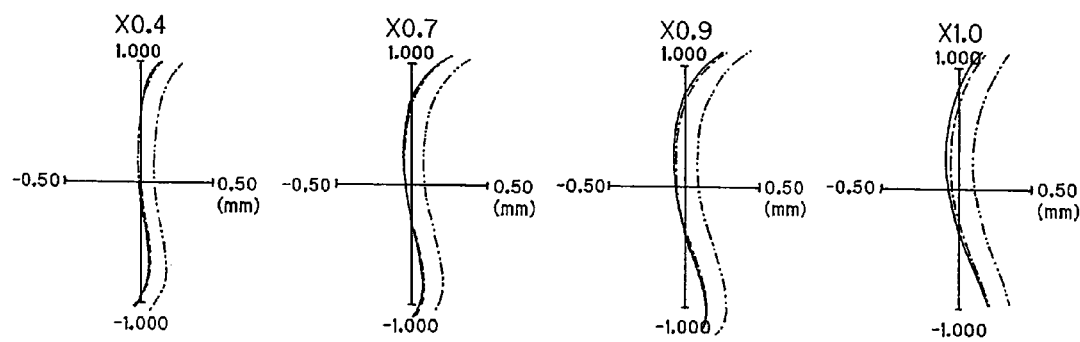
Figure 14C:
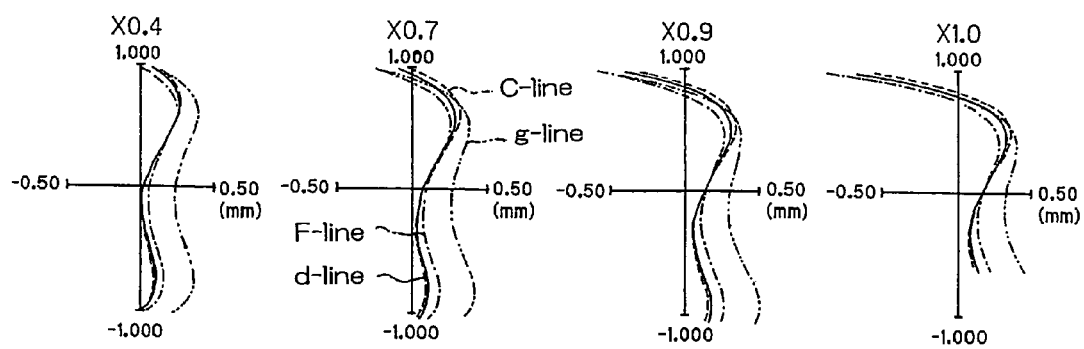
Figure 15A:
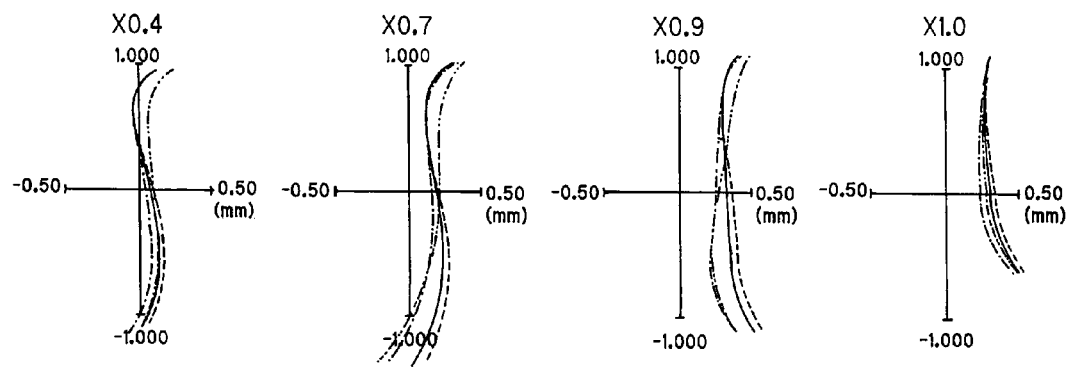
FIG. 15 is a transverse aberration diagram for Example 3 at a subject distance of 250 mm.
Figure 15B:
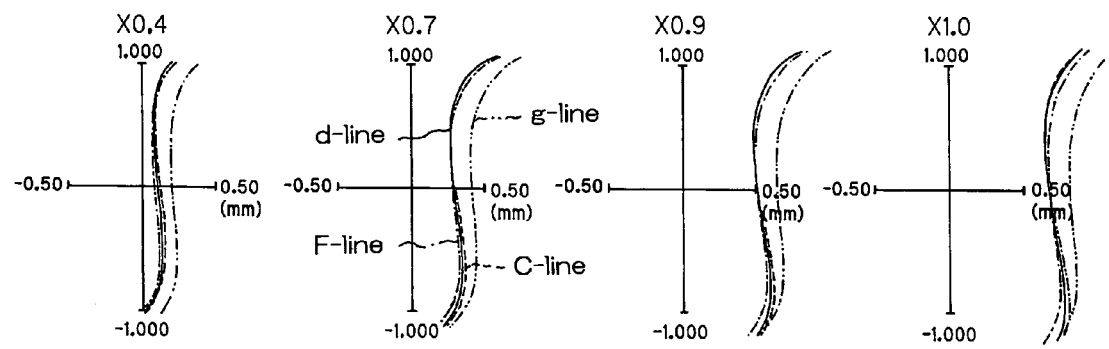
Figure 15C:
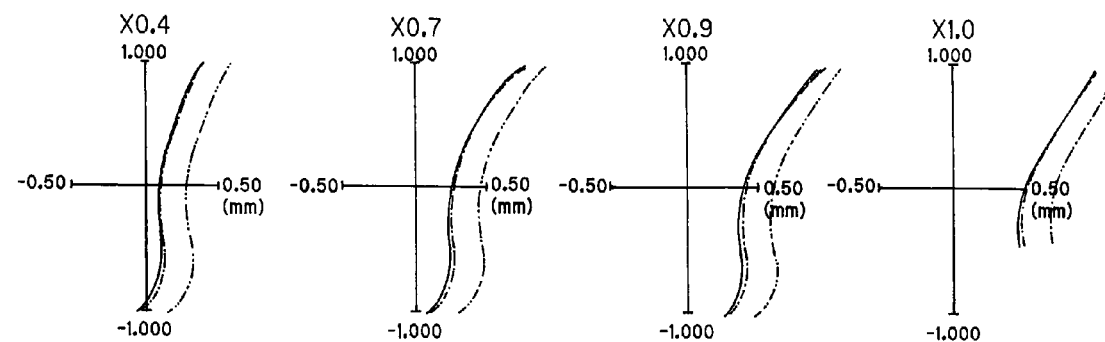

FIGS. 4 and 5 are aberration diagrams for Example 1 upon focusing on an infinite object point and a subject distance of 250 mm, respectively. In these diagrams, spherical aberration, astigmatism, distortion and chromatic aberration of magnification at the wide-angle end (a), in the intermediate state (b) and at the telephoto end (c) are shown with "FIY" indicative of the maximum image height. FIGS. 6 and 7 are similar aberration diagrams for Example 2, and FIGS. 8 and 9 are similar aberration diagrams for Example 3. FIGS. 10 and 11 are transverse aberration diagrams for Example 1 at the wide-angle end (a), in the intermediate state (b) and at the telephoto end (c) upon focusing on an infinite object point and a subject distance of 250 mm. FIGS. 12 and 13 are similar transverse aberration diagrams for Example 2, and FIGS. 14 and 15 are similar transverse aberration diagrams for Example 3. In these transverse aberration diagrams, ×0.4, ×0.7, ×0.9, and ×1.0 is indicative of the magnification of an image height with respect to the maximum image height, and transverse aberrations at such image heights.

Set out below are the values of conditions (1), (2), (A), and (3)-(8).

| Condition | Example 1 | Example 2 | Example 3 |
|---|---|---|---|
| (1) | 0.074 | 0.023 | 0.022 |
| (2) | −0.790 | −1.046 | −1.151 |
| (A) | −0.05 | −0.62 | −0.65 |
| (3) | 1.84 | 1.84 | 1.83 |
| (4) | 0.67 | 0.67 | 0.60 |
| (5) | 2.64 | 2.74 | 2.29 |
| (6) | 1.525 | 1.525 | 1.525 |
| (7) | 81.5 | 81.5 | 81.5 |
| (8) | 0.247 | 0.263 | 0.248 |

Figure 16:
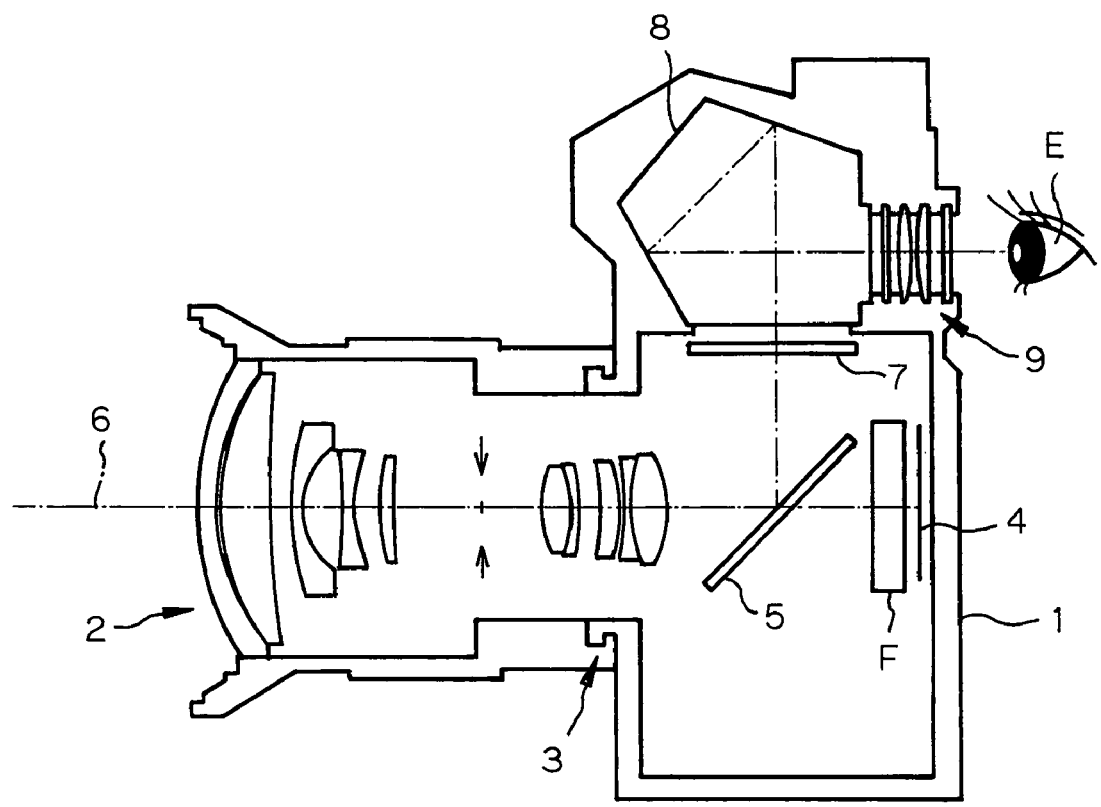
FIG. 16 is a sectional view of a single-lens reflex camera with the inventive zoom lens used as an interchangeable lens.

FIG. 16 is a sectional view of a single-lens reflex camera as an electronic imaging apparatus, with the inventive zoom lens incorporated in it and a small-format CCD, CMOS or the like used as an imaging device. In FIG. 16, reference numeral 1 is indicative of the single-lens reflex camera; 2 a taking lens system located in a lens barrel comprising a zooming mechanism and a focusing mechanism; and 3 a mount of the lens barrel that makes the taking lens system 2 attachable to or detachable from the single-lens reflex camera 1, for instance, a screw type mount or a bayonet type mount. In the example here, the bayonet type mount is used.

Reference numeral 4 stands for the plane of the imaging device; 5 a quick return mirror located between the lens system and the plane 4 of the imaging device on the optical path 6 of the taking lens system 2; 7 a finder screen disposed on the optical path taken by light reflected off the quick return mirror 5; 8 a penta prism; 9 a finder; and E the eye of a viewer (eye point).

For the taking lens system 2 of the single-lens reflex camera 1 having such construction, for instance, the inventive zoom lens exemplified in each of Examples 1, 2 and 3 may be used.

According to the invention as described above, a zoom lens that makes sure being gast and substantially free of fluctuations of astigmatism with zooming is achievable as an interchangeable lens suited for use on a single-lens reflex camera type digital camera. It is thus possible to achieve a zoom lens that, albeit being a fast one, facilitates making sure the angle of view at the wide-angle end and taking hold of the zoom ratio, as desired.

What we claim is:

1. A zoom lens comprising, in order from an object side to an image side thereof, a first lens group of positive refracting power, a second lens group of negative refracting power, and a third lens group of positive refracting power, with an aperture stop located in a space between said second lens group and said third lens group, wherein:

upon zooming from a wide-angle end to a telephoto end of the zoom lens, said first lens group, said second lens group, and said third lens group each moves in unison, said second lens group moves toward the object side after moving toward the image side, and at the telephoto end with respect to the wide-angle end, said first lens group is positioned closer to the object side, and said third lens group is positioned closer to the object side;

said first lens group comprises, in order from the object side, one negative lens, and one or two positive lenses, wherein a total number of lenses in said first lens group is 3 or less;

said second lens group comprises, in order from the object side, a first negative meniscus lens convex on the object side, a second negative lens wherein an image side surface is larger in an absolute value of a paraxial curvature than an object side surface, and a third positive lens wherein an object side surface is larger in an absolute value of a paraxial curvature than an image side surface, wherein a total number of lenses in said second lens group is 3;

upon focusing from a far object to a near object, the second lens group moves; and said zoom lens is a three-group zoom lens that satisfies the following conditions:

$$-0.1 < m_2/f_t < 0.4 \quad (1)$$

$$-1.3 < (r_{2g3} + r_{2g4})/(r_{2g4} - r_{2g3}) < -0.65 \quad (2)$$

where, $f_t$ is a focal length of the whole zoom lens system at the telephoto end, $m_2$ is an amount of movement of the second lens group at the telephoto end with respect to the wide-angle end with a plus sign indicative of a displacement of the second lens group toward the object side, $r_{2g3}$ is a paraxial radius of curvature of the object side surface of the second negative lens in the second lens group, and $r_{2g4}$ is a paraxial radius of curvature of the image side surface of the second negative lens in the second lens group.

2. The zoom lens according to claim 1, wherein said second lens group satisfies condition (A):

$$-3.0 < m_{2ws}/m_{2st} < 0 \quad (A)$$

where $m_{2ws}$ is an amount of movement of the second lens group at the wide-angle end in a state where there is a focal length defined by $0.442 \times (f_w + f_t)$, with a plus sign indicative of a displacement of the second lens group toward the object side, and $m_{2st}$ is an amount of movement of the second lens group at the telephoto end in a state where there is a focal length defined by $0.442 \times (f_w + f_t)$, with a plus sign indicative of a displacement of the second lens group toward the object side, where $f_w$ is a focal length of the whole zoom lens system at the wide-angle end.

3. The zoom lens according to claim 1, which satisfies condition (3):

$$1.6 < \Sigma d_w/f_{bw} < 2.2 \quad (3)$$

where $\Sigma d_w$ is a distance from a surface located nearest to the object side in the first lens group to a surface located nearest to the image side in the third lens group as measured along an optical axis at the wide-angle end, and $f_{bw}$ is a distance from the surface located nearest to the image side in the third lens group to a focal point as measured along the optical axis at the wide-angle end.

4. The zoom lens according to claim 1, which satisfies condition (4):

$$0.5 < m_1/f_t < 0.9 \quad (4)$$

where $m_1$ is an amount of movement of the first lens group at the telephoto end with respect to the wide-angle end, with a plus sign indicative of a displacement of the first lens group toward the object side.

5. The zoom lens according to claim 1, which satisfies condition (5):

$$1.5 < f_1/f_t < 4 \quad (5)$$

where $f_1$ is a focal length of the first lens group.

6. The zoom lens according to claim 1, wherein said third lens group comprises, in order from the object side, a cemented lens, a single lens, and a cemented lens, wherein two such cemented lenses each comprise a positive lens and a negative lens.

7. The zoom lens according to claim 6, which satisfies conditions (6) and (7):

$$1.45 < n_{3g2} < 1.6 \quad (6)$$

$$77 < \nu_{3g3p} < 90 \quad (7)$$

where $n_{3g2}$ is a refractive index of the single lens in the third lens group, and $\nu_{3g3p}$ is an Abbe constant of all positive lenses included in an image side cemented lens in the third lens group.

8. The zoom lens according to claim 1, which satisfies condition (8):

$$0.2 < n_{2g1} - n_{2g2} < 0.3 \quad (8)$$

where $n_{2g1}$ is a refractive index of the first negative lens in the second lens group, and $n_{2g2}$ is a refractive index of the second negative lens in the second lens group.

9. The zoom lens according to claim 1, wherein at the telephoto end with respect to the wide-angle end, a distance along an optical axis between said second lens group and said aperture stop become short, and a distance along the optical axis between said aperture stop and said third lens group becomes short.

10. The zoom lens according to claim 1, which has a half angle of view of 35° to 45° at the wide-angle end and a zoom ratio of 2.5 to 4.

* * * * *